(12) United States Patent
Lee et al.

(10) Patent No.: US 8,144,660 B2
(45) Date of Patent: Mar. 27, 2012

(54) MULTIMODE TERMINAL FOR SUPPORTING FAST HANDOVER BETWEEN HETEROGENEOUS NETWORKS

(75) Inventors: Su Won Lee, Seongnam-si (KR); Jong Ho Bang, Suwon-si (KR); Seong Ho Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 816 days.

(21) Appl. No.: 11/927,769

(22) Filed: Oct. 30, 2007

(65) Prior Publication Data
US 2008/0298321 A1 Dec. 4, 2008

(30) Foreign Application Priority Data
May 28, 2007 (KR) .................. 10-2007-0051706

(51) Int. Cl.
*H04W 4/00* (2009.01)
(52) U.S. Cl. ......... 370/331; 370/338; 370/341; 370/350
(58) Field of Classification Search .................. 370/331, 370/338, 352, 395.2, 401, 332, 334, 341, 370/350; 455/432.1, 553.1
See application file for complete search history.

(56) References Cited

U.S. PATENT DOCUMENTS
7,236,781 B2 * 6/2007 Patil et al. .................. 455/432.1
(Continued)

FOREIGN PATENT DOCUMENTS
JP 2005-159929 A 6/2005
(Continued)

OTHER PUBLICATIONS

Wakikawa Keio University T Ernst Inria K Nagami Intec Netcore V Devarapalli Azaire Networks R: "Multiple Care-of Addresses Registration; draft-ietf-monami6-multiplecoa-02.txt" IETF Standard-Working Draft, Internet Engineering Task Force, IETF, CH, vol. monami6, No. 2, Mar. 5, 2007, XP015049595 ISSN: 0000-0004 "Chapter 1 to 5".

(Continued)

*Primary Examiner* — Hassan Kizou
*Assistant Examiner* — Toan Nguyen
(74) *Attorney, Agent, or Firm* — Sughrue Mion, PLLC

(57) ABSTRACT

A multi-mode terminal (MMT) including a plurality of interfaces which provides access capability to heterogeneous networks respectively to provide quick handover between the heterogeneous networks, is provided. In this instance, when a Binding Update (BU) message is transmitted to a home agent via each of the plurality of interfaces, routers existing in a path to the home agent may update path latency information and path bandwidth information as a Binding Unique Identifier (BID) sub-option extension of Mobile Nodes and Multiple Interfaces in Internet Protocol version 6 (MONAMI6). In this case, the home agent may receive the BU message and select a care-of address (CoA) by referring to path latency information and path bandwidth information, included in the BU message. Also, the home agent may transmit a success binding acknowledgement (BAck) message with respect to the BU message of the selected path.

24 Claims, 11 Drawing Sheets

U.S. PATENT DOCUMENTS

| | | |
|---|---|---|
| 7,680,081 B2 * | 3/2010 | Kamura et al. ............... 370/332 |
| 2004/0264438 A1 * | 12/2004 | Oldham et al. ............... 370/352 |
| 2005/0208966 A1 * | 9/2005 | David et al. ................ 455/553.1 |
| 2006/0120329 A1 | 6/2006 | Kim et al. |
| 2006/0183479 A1 | 8/2006 | Liu et al. |
| 2006/0268784 A1 | 11/2006 | Lee et al. |
| 2007/0086382 A1 * | 4/2007 | Narayanan et al. .......... 370/331 |
| 2007/0091846 A1 | 4/2007 | Kim et al. |
| 2007/0217427 A1 * | 9/2007 | Chung ....................... 370/395.2 |
| 2008/0008196 A1 * | 1/2008 | Hong .......................... 370/401 |
| 2009/0116463 A1 * | 5/2009 | Hirano et al. ................ 370/338 |

FOREIGN PATENT DOCUMENTS

| | | |
|---|---|---|
| KR | 10-2006-000071 A | 1/2006 |
| KR | 10-2006-0038689 A | 5/2006 |
| KR | 10-2006-0098630 A | 9/2006 |
| KR | 10-2006-0128334 A | 12/2006 |

OTHER PUBLICATIONS

Extended European Search Report issued on Aug. 27, 2010 in counterpart European Application No. 08704610.8.

* cited by examiner

FIG. 4

| Syntax | Size (Octets) | Notes |
|---|---|---|
| N_Subnet | 1 | The number of source subnets |
| N_Dest_Subnet | 1 | The number of destination subnets |
| For (i=0; i<N_Subnet; i++) { | | |
| Source Subnet Prefix | Variable | Source subnet prefix — 401 |
| For (i=0; i<N_Dest_Subnet; i++) { | | |
| Destination Subnet Prefix | Variable | Destination subnet prefix — 402 |
| Path_Latency | 4 | End-to-End Delay (ms) — 403 |
| Path_Rate | 4 | Available BW (Mbps) — 404 |
| TTL | 4 | Expiration time (ms) — 405 |
| ~ | | |
| ~ | | |

400

MULTIMODE TERMINAL FOR SUPPORTING FAST HANDOVER BETWEEN HETEROGENEOUS NETWORKS

CROSS-REFERENCE TO RELATED APPLICATION

This application claims priority from Korean Patent Application No. 10-2007-0051706, filed on May 28, 2007, in the Korean Intellectual Property Office, the entire disclosure of which is incorporated herein by reference.

BACKGROUND OF THE INVENTION

1. Field of the Invention

Methods and apparatuses consistent with the present invention relate to a mobile data communication method and apparatus, and more particularly, to vertical handover (VHO) between heterogeneous networks of a multi-mobile terminal (MMT).

2. Description of Related Art

With the developments in mobile data communication technologies, there is a need for supporting a VHO between homogenous networks. Also, there is a need for seamless and quick handover even when a mobile station moves between the heterogeneous networks. A handover between the heterogeneous networks changes a network layer and a lower layer, which is different from a handover between homogenous networks. With regard to the handover between the heterogeneous networks, the Institute of Electrical and Electronics Engineers (IEEE) 802.21 standard proposes a Media Independent Handover (MIH) to support the seamless handover between the heterogeneous networks with respect to $3^{rd}$ generation (3G) cellular networks, such as $3^{rd}$ Generation Partnership Project (3GPP), IEEE 802 networks, such as IEEE 802.3, IEEE 802.11, and IEEE 802.16, and the like.

SUMMARY OF THE INVENTION

The present invention provides an MMT, a router, a home agent apparatus, and an information server to provide seamless vertical handover (VHO) between heterogeneous networks.

The present invention also provides a method and apparatus which can quickly perform VHO when an MMT moves in a data communication environment where heterogeneous networks are present.

The present invention also provides a method and apparatus wherein an MMT can acquire path latency information and path bandwidth information of each of available heterogeneous networks in a data communication environment where the heterogeneous networks are present. In this instance, an objective of the present invention is to enable the MMT to select an optimal network by using the path latency information and the path bandwidth information of each of the heterogeneous networks and to use the selected optimal network.

The present invention also provides a method and apparatus for VHO in an environment where Mobile Internet Protocol (MIP) and Media Independent Handover (MIH) are used.

According to an aspect of the present invention, there is provided an MMT including a plurality of interfaces which provides access capability to heterogeneous networks respectively to provide quick handover between the heterogeneous networks. In this instance, when a Binding Update (BU) message is transmitted to a home agent via each of the plurality of interfaces, routers existing in a path to the home agent may update path latency information and path bandwidth information in a Binding Unique Identifier (BID) sub-option extension of Mobile Nodes and Multiple Interfaces in Internet Protocol version 6 (MONAMI6). In this case, the home agent may receive the BU message and select a care-of address (CoA) by referring to path latency information and path bandwidth information, included in the BU message. Also, the home agent may transmit a success binding acknowledgement (BAck) message with respect to the BU message of the selected path.

According to another aspect of the present invention, there is provided an MMT including: a plurality of interfaces which provides access capability to heterogeneous networks respectively; and a controller which transmits a BU message to a home agent via each of the plurality of interfaces. In this instance, when the MMT is powered on, the controller may transmit the BU message to the home agent via each of the plurality of interfaces. Also, the BU message may include at least one of 1) a length of a subnet prefix of a CoA wherein the CoA is acquired for an interface to transmit the BU message, 2) a number of BU messages which are transmitted to the home agent via the plurality of interfaces, and 3) information about a direction to be considered in a selection of binding. Also, the controller may select an interface which receives a success BAck message from the home agent, and perform communication using the selected interface. Also, the controller may convert remaining interfaces, excluding the selected interface, among the plurality of interfaces, into a sleep mode.

According to another aspect of the present invention, there is provided an MMT including: a plurality of interfaces which provides access capability to heterogeneous networks respectively, wherein remaining interfaces, excluding a selected interface among the plurality of interfaces, are set to a sleep mode; and a controller which requests an information server for first information about each of the networks which the remaining interfaces provide the access capability to, when a wireless signal received via the selected interface becomes weak. In this instance, the controller may select an appropriate interface based on the first information received from the information server. Also, the first information may include latency and available bandwidth from a subnet of the MMT to a destination subnet, with respect to each of the networks which the remaining interfaces provide the access capability to.

According to still another aspect of the present invention, there is provided an MMT including: a plurality of interfaces which provides access capability to heterogeneous networks respectively wherein remaining interfaces, excluding a selected interface among the plurality of interfaces, are set to a sleep mode; and a controller which periodically requests an information server for first information about each of the heterogeneous networks which the plurality of interfaces provide the access capability to the plurality of interfaces. In this instance, when an interface with a better network performance than the selected interface is detected, the controller may convert the detected interface into a wake-up mode, and perform communication using the detected interface based on the first information received from the information server. Also, when the interface with the better network performance than the selected interface is detected, the controller may convert the selected interface into a sleep mode.

According to yet another aspect of the present invention, there is provided a router including: a receiver which receives a BU message wherein the BU message includes at least one of path latency information and path bandwidth information as a BID sub-option extension of MONAMI6; a controller which updates at least one of the path latency information and the path bandwidth information, included in the BU message; and a transmitter which transmits the updated BU message to a next hop.

According to a further aspect of the present invention, there is provided a home agent apparatus including: a receiver which receives a plurality of BU messages from a single MMT wherein each of the plurality of BU messages includes 1) at least one of path latency information and path bandwidth information and 2) a CoA; and a controller which selects a CoA with respect to the MMT based on at least one of the path latency information and the path bandwidth information. In this instance, the controller may transmit a success BAck message with respect to a first BU message of the selected CoA, and transmit a failure BAck message with respect to remaining BU messages, excluding the first BU message among the plurality of BU messages. Also, the controller may transmit the path latency information and the path bandwidth information, included in the BU message, to an information server.

According to another aspect of the present invention, there is provided an information server including: an information repository which stores, with respect to at least one source subnet, 1) a subnet prefix of the at least one source subnet, and 2) at least one of path latency information and path bandwidth information about a path from the at least one source subnet to at least one destination subnet; and a controller which transmits, to the MMT in response to a request from a MMT, 1) the subnet prefix of each of the at least one source subnet, and 2) at least one of the path latency information and the path bandwidth information about the path from each of the at least one source subnet to the at least one destination subnet, wherein 1) and 2) are stored in the information repository in association with the at least one source subnet of the MMT. In this instance, the controller may receive path latency information and path bandwidth information, included in a BU message, from either a home agent apparatus or a CN, and may update the information repository by referring to the received path latency information and the path bandwidth information.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 4 illustrates syntax of data stored in an information server according to an exemplary embodiment of the present invention;

DETAILED DESCRIPTION OF EXEMPLARY EMBODIMENTS

Figure 1:
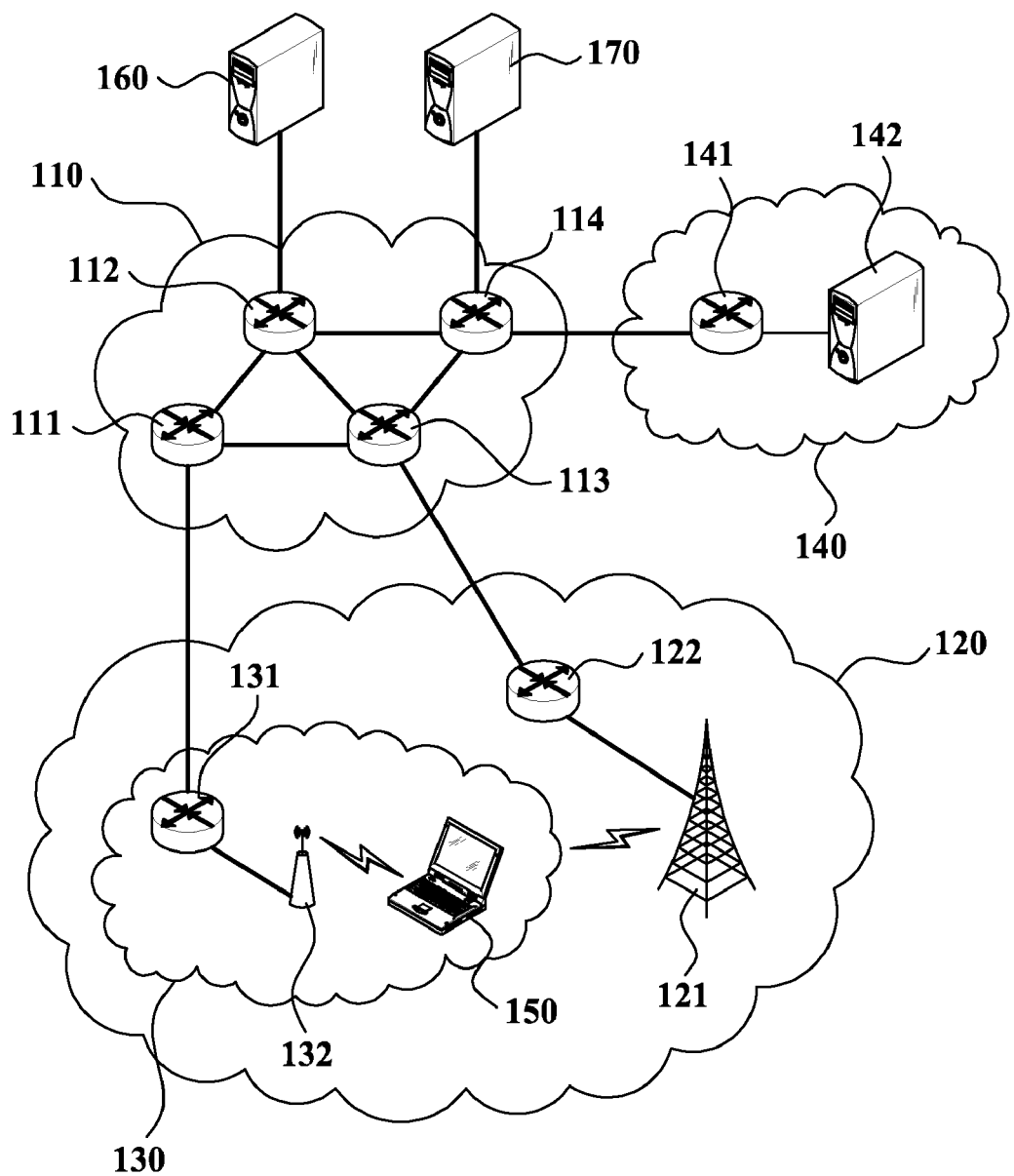
FIG. 1 illustrates a network connection between an MMT, a router, a home agent, a correspondent node, and an information server according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 illustrates a network connection between an MMT 150, a router, a home agent 142, a correspondent node (CN) 160, and an information server 170 according to an exemplary embodiment of the present invention.

The MMT 150 includes a plurality of interfaces. In this exemplary embodiment, each of the plurality of interfaces provides access capability to respective heterogeneous networks. Referring to FIG. 1, the MMT 150 may access a first network 120 and a second network 130. In this instance, the first network 120 and the second network 130 correspond to the heterogeneous networks which are different from each other. For example, the first network 120 may be a wireless broadband Internet (WiBro) network, and the second network 130 may be a wireless local area network (WLAN). In this case, the MMT 150 may include two interfaces. One interface may provide access capability to the WiBro network and the other interface may provide access capability to the WLAN.

Also, the MMT 150 transmits a Binding Update (BU) message to the home agent 142 via each of the plurality of interfaces to select one network from a plurality of accessible heterogeneous networks. The MMT 150 transmits a first BU message via the first network 120, and transmits a second BU message via the second network 130. In this instance, the BU message may use a Binding Unique Identifier (BID) sub-option extension of Mobile Nodes and Multiple Interfaces in Internet Protocol version 6 (MONAMI6) of Internet Engineering Task Force (IETF), which is used for registration method for multiple CoAs. Also, the BID sub-option extension includes a Path_Latency field which stores path latency information of a path via which the BU message is transmitted, and a Path_Rate field which stores available bandwidth information of the path. The home agent 142 selects an optimal CoA with respect to the MMT 150 by referring to the Path_Latency field and the Path_Rate field of each of the received first BU message and the second BU message.

As described above, the first network 120 and the second network 130 are heterogeneous networks. First and second base stations 121 and 132 enable the MMT 150 to access a mobile network. When the first network 120 is the WiBro network, the first base station 121 is referred to as a radio access station (RAS). Also, when the second network 130 is the WLAN, the second base station 132 is referred to as an access point (AP). In FIG. 1, the MMT 150 receives a wireless signal from the first base station (RAS) 121 of the first network (WiBro network) 120, and also receives another wireless signal from the second base station (AP) 132 of the second network (WLAN) 130. Accordingly, in this case, for data communication, the MMT 150 may use the first network (WiBro network) 120 or the second network (WLAN) 130.

Routers 122 and 131 receive data packets from previous hops 121 and 132, and transfer the received data packets to next hops 111 and 113. When the first network 120 is the WiBro network, the router 122 is referred to as an access control router (ACR). Also, when the second network 130 is the WLAN, the router 131 is referred to as an access router (AR).

The first network 120, the second network 130, a home network 140, the CN 160, and the information server 170 are connected to each other via an Internet Protocol (IP) core network 110. The IP core network 110 includes a plurality of routers 111, 112, 113, and 114 and routes data packets by using the plurality of routers 111, 112, 113, and 114.

Also, the home network 140 includes a router 141 and the home agent 142. In this instance, a packet to the MMT 150 is transmitted to the MMT 150 via the home agent 142. Accordingly, wherever the MMT 150 moves to, the MMT 150 can receive a data communication service.

Also, the home agent 142 includes a receiver (not shown) and a controller (not shown). The receiver receives a plurality of BU messages from the MMT 150. In this instance, each of the BU messages includes 1) at least one of path latency information and path bandwidth information, and 2) a CoA. Also, the controller selects a CoA with respect to the MMT 150 based on at least one of the path latency information and the path bandwidth information.

The CN 160 is a correspondent party which communicates with the MMT 150.

Also, the information server 170 stores information about all the networks or a portion of a network. In the present specification, the information server 170 dynamically updates information about a network which dynamically changes. For example, the information server 170 stores path latency information and path bandwidth information of each of a plurality of paths. In this instance, the path latency information and the path bandwidth information is dynamically updated.

Figure 2:
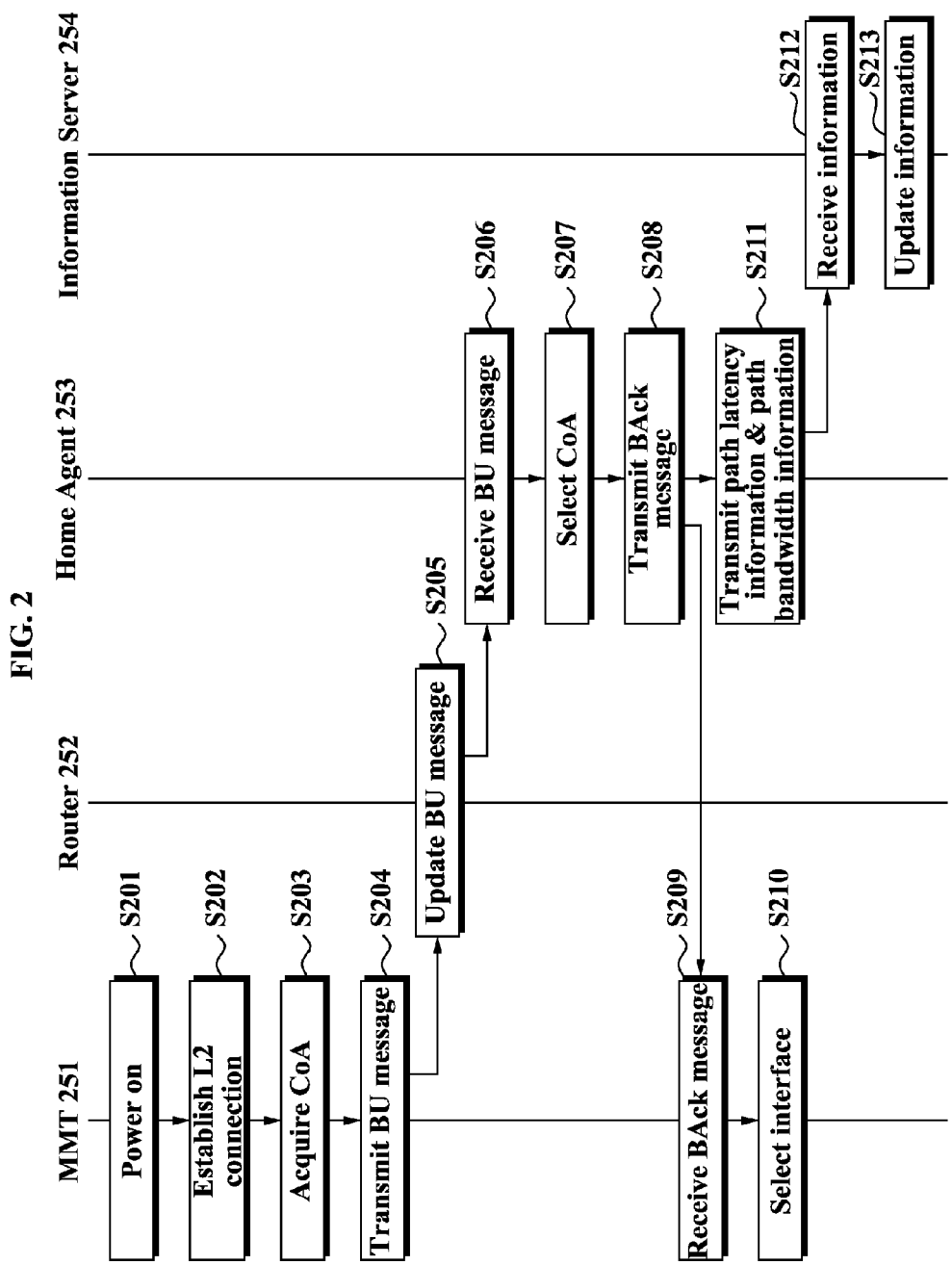
FIG. 2 is a flowchart illustrating an operation of allocating a CoA to an MMT when the MMT is powered on and the MMT is located to be capable of receiving a network access service from a plurality of heterogeneous networks according to an exemplary embodiment of the present invention.

FIG. 2 is a flowchart illustrating an operation of allocating a CoA to an MMT 251 when the MMT 251 is powered on and the MMT 251 is located to be capable of receiving a network access service from a plurality of heterogeneous networks according to an exemplary embodiment of the present invention.

In operation S201, the MMT 251 is powered on.

In operation S202, the MMT 251 establishes a Layer 2 (L2) connection to each of a plurality of accessible heterogeneous networks by using a plurality of interfaces of the MMT 251. Referring again to FIG. 1, the MMT 150 includes a first interface with respect to the first network (WiBro network) 120 and a second interface with respect to the second network (WLAN) 130. When the MMT 150 is powered on, the first interface establishes an L2 connection to the first network (WiBro) network 120. Also, the second interface establishes an L2 connection to the second network (WLAN) 130. Particularly, the first interface establishes an L2 connection to the first base station (RAS) 121 of the first network (WiBro network) 120, and the second interface establishes an L2 connection to the second base station (AP) 132 of the second network (WLAN) 130.

In operation S203, the MMT 251 acquires a CoA with respect to each of the plurality of interfaces. For example, when the MMT includes two heterogeneous networks, the MMT 251 acquires a first CoA with respect to the first interface and acquires a second CoA with respect to the second interface. In this instance, the CoA may be acquired by using dynamic host configuration protocol (DHCP). Also, the CoA may be acquired by using a router advertisement (RA) message.

In operation S204, the MMT 251 transmits a BU message to a home agent 253 via each of the plurality of interfaces. In this instance, the MMT 251 may use a mobile Internet Protocol (MIP) for processing of the BU message. Referring again to FIG. 1, the MMT 150 transmits a first BU message to the home agent 142 by using the first interface and the first network 120. Also, the MMT 150 transmits a second BU message to the home agent 142 by using the second interface and the second network 120. In this instance, when the first network 120 is a WiBro network, and the second network 130 is a WLAN, the MMT 150 transmits the BU message to the home agent 142 using both the first network (WiBro network) 120 and the second network (WLAN) 130.

The MMT 251 may utilize a multiple CoA registration method which is defined in MONAMI6 of IETF, for registering multiple CoAs. Also, the MMT 251 transmits the BU message using the BID sub-option extension. In this instance, the BU message includes an L_Source_Subnet_Prefix field, an N_BUs field, a Direction field, an E field, and the like. Also, the BU message includes a Path_Latency field and a Path_Rate field as the BID sub-option extension. According to an exemplary embodiment of the present invention, the Path_Latency field and the Path_Rate field may be subdivided into an Fwd_Path_Latency field, a Rev_Path_Latency field, an Fwd_Path_Rate field, and a Rev_Path_Rate field.

Also, the BU message includes a CoA with respect to an interface via which the BU messages is transmitted. For example, the first BU message transmitted via the first interface includes a first CoA with respect to the first interface. Also, the second BU message transmitted via the second interface includes a second CoA with respect to the second interface.

Also, the BU message includes an N_BUs field. In this instance, the N_BUs field stores a number of BU messages which are transmitted to the home agent 253 via the plurality of interfaces. For example, referring again to FIG. 1, when the MMT 150 transmits the first BU message to the home agent 142 using the first interface and the first network 120, and also transmits the second BU message to the home agent 142 using the second interface and the second network 130, the MMT 150 transmits two BU messages.

Also, the BU message may further include an L_Source_Subnet_Prefix field. The L_Source_Subnet_Prefix field stores a length of a subnet prefix of the CoA. Also, the BU message may further include a Direction field. The Direction field stores information about a direction to be considered in a selection of binding.

In operation S205, a router 252 updates the received BU message. In this instance, the received BU message includes at least one of path latency information and path bandwidth information as a BID sub-option extension of MONAMI6. The router 252 updates at least one of the path latency information and the path bandwidth information of the BU message.

In this instance, the path latency information includes information about latency of a path where the router 252 is located. The path latency information of the BU message is stored in the Path_Latency field. Referring again to FIG. 1, a path from the MMT 150 to the home agent 142 via the first network 120 includes a plurality of routers 113, 114, 122, and 141. In this instance, path latency information of the path may be acquired by adding up latency in each of the routers 113, 114, 122, and 141. Also, another path from the MMT 150 to the home agent 142 via the second network 130 includes a plurality of routers 111, 112, 114, 131, and 141. In this instance, path latency information of the other path may be acquired by adding up latency in each of the routers 111, 112, 114, 131, and 141.

Also, the path bandwidth information indicates information about an available bandwidth of the path where the router 252 is located. The path bandwidth information of the BU message is stored in the Path_Rate field. Referring again to FIG. 1, the path from the MMT 150 to the home agent 142 via the first network 120 includes the routers 113, 114, 122, and 141. In this instance, path bandwidth information of the path may have a smallest value among the available bandwidth in each of the routers 113, 114, 122, and 141. Also, the other path from the MMT 150 to the home agent 142 via the second network 130 includes the routers 111, 112, 114, 131, and 141. In this instance, path bandwidth information of the other path may have a smallest value among the available bandwidth in each of the routers 111, 112, 114, 131, and 141.

As described above, the path from the MMT 150 to the home agent 142 via the first network 120 includes the routers 113, 114, 122, and 141 and thus each of the routers 113, 114, 122, and 141 updates the Path_Latency field and the Path_Rate field of the first BU message which is received from a previous hop. Also, each of the routers 113, 114, 122, and 141 adds path latency of each of the routers 113, 114, 122, and 141 to the Path_Latency field of the first BU message. Also, each of the routers 113, 114, 122, and 141 compares the Path_Rate field of the first BU message with the available bandwidth of each of the routers 113, 114, 122, and 141. When the available bandwidth of each of the routers 113, 114, 122, and 141 is less than the Path_Rate field, each of the routers 113, 114, 122, and 141 updates the Path_Rate field to the available bandwidth of each of the routers 113, 114, 122, and 141. In this instance, the updating is performed by all the routers that exist on the path. Also, each of the routers 111, 112, 114, 131, and 141, which exist on the other path from the MMT 150 to the home agent 142 via the second network 130, updates the Path_Latency field and the Path_Rate field of the second BU message, which is received from a previous hop.

Also, the router 252 transmits the updated BU message to a next hop. The updated message using the routers 252 existing on the path is transferred to the home agent 253.

In operation S206, the home agent 253 receives the plurality of BU messages transmitted by the MMT 251. Referring again to FIG. 1, the home agent 142 receives the first BU message from the MMT 150 via the first network 120, and also receives the second BU message from the MMT 150 via the second network 130. In this instance, each of the first BU message and the second BU message includes the Path_Latency field and the Path_Rate field. Also, the first BU message includes the first CoA with respect to the first interface of the MMT 150 via which the first BU message is transmitted, and the second BU message includes the second CoA with respect to the second interface of the MMT 150 via which the second BU message is transmitted.

In operation S207, the home agent 253 verifies the N_BUs field of the BU message. In this instance, when the N_BUs field is "1", it indicates that only one accessible network of the MMT 251 exists. Accordingly, binding is performed by using the CoA included in the BU message, so that the MMT 251 may use the network.

Also, when the N_BUs field is greater than or equal to 2, the home agent 253 selects a CoA with respect to the MMT 251 based on at least one of the Path_Latency field and the Path_Rate field of the BU message. Referring again to FIG. 1, the home agent 142 receives the first BU message from the MMT 150 via the first network 120, and also receives the second BU message from the MMT 150 via the second network 130. Also, the home agent 142 selects one network by referring to at least one of the Path_Latency field and the Path_Rate field of each of the first BU message and the second BU message. For example, when the first network 120 is a WiBro network, the second network 130 is a WLAN, and path latency and path bandwidth of the second network (WLAN) 130 is better than the first network (WiBro network) 120, the home agent 142 selects the second BU message which is received via the second network (WLAN) 130. Accordingly, the home agent 142 performs binding by using the second CoA included in the second BU message.

According to an exemplary embodiment of the present invention, path latency information and path bandwidth information includes forward information and reverse information. In this case, a home agent selects a CoA by using at least one of the forward information and the reverse information based on a path direction, which will be described later in detail with reference to FIG. 5.

In operation S208, the home agent 253 transmits a binding acknowledgement (BAck) message to the MMT 251. The home agent 253 transmits a success BAck message with respect to the BU message of the selected CoA. Also, the home agent 53 transmits a failure BAck message with respect to remaining BU messages, excluding the BU message of the selected CoA among the plurality of BU messages. In the above example, when the second CoA of the second BU message among the first BU message and the second BU message is selected, the home agent 253 transmits a success BAck message with respect to the second BU message, and transmits a failure BAck message with respect to the first BU message.

In operation S209, the MMT 251 receives the BAck message from the home agent 253. Referring again to FIG. 1, the MMT 150 receives the failure BAck message with respect to the first BU message which is transmitted via the first interface, and receives the success BAck message with respect to the second BU message which is transmitted via the second interface.

In operation S210, the MMT 251 selects an interface which receives the success BAck message from the home agent 253, and performs communication using the selected interface. Also, the MMT 251 converts remaining interfaces, excluding the selected interface, into a sleep mode. Referring again to FIG. 1, the MMT 150 receives the failure BAck message with respect to the first BU message which is transmitted via the first interface. Accordingly, the MMT 150 converts the first interface into the sleep mode. Also, the MMT 150 receives the success BAck message with respect to the second BU message which is transmitted via the second interface and thus performs communication using the second interface. Specifically, the MMT 150 may use both the first network 120, for example, a WiBro network, and the second network 130, for example, a WLAN. However, since the second network 130 has a better performance, the MMT 150 selects the second network 130 and performs wireless data communication using the selected second network 130 without using the first network 120.

In operation S211, the home agent 253 transmits path latency information and path bandwidth information, which are included in the received BU message, to an information server 254. Referring again to FIG. 1, the home agent 142 receives two BU messages from the MMT 150, and transmits path latency information and path bandwidth information, which are included in each of the two BU messages, to the information server 170. In this instance, the home agent 142 extracts a source subnet prefix and a destination subnet prefix from the BU message. Also, the home agent 142 transmits data of the Path_Latency field and data of the Path_Rate field to the information server 170 together with the source subnet prefix and the destination subnet prefix. In this instance, the data of the Path_Latency field and the data of the Path_Rate field indicate path latency information and bandwidth information, respectively, of a path from a source subnet to a destination subnet. According to an exemplary embodiment of the present invention, path latency information and path bandwidth information of a path from a source subnet to a destination subnet may include forward information and reverse information respectively.

In operation S212, the information server 254 receives the source subnet prefix, the destination subnet prefix, the path latency information, and the path bandwidth information from the home agent 253.

In operation S213, the information server 254 updates an information repository by referring to the received information, for example, the path latency information, the path bandwidth information, and the like. Also, the information server 254 updates the path latency information and the path bandwidth information of the path from the source subnet to the destination subnet with respect to a pair of the source subnet prefix and the destination subnet prefix.

Figure 3:
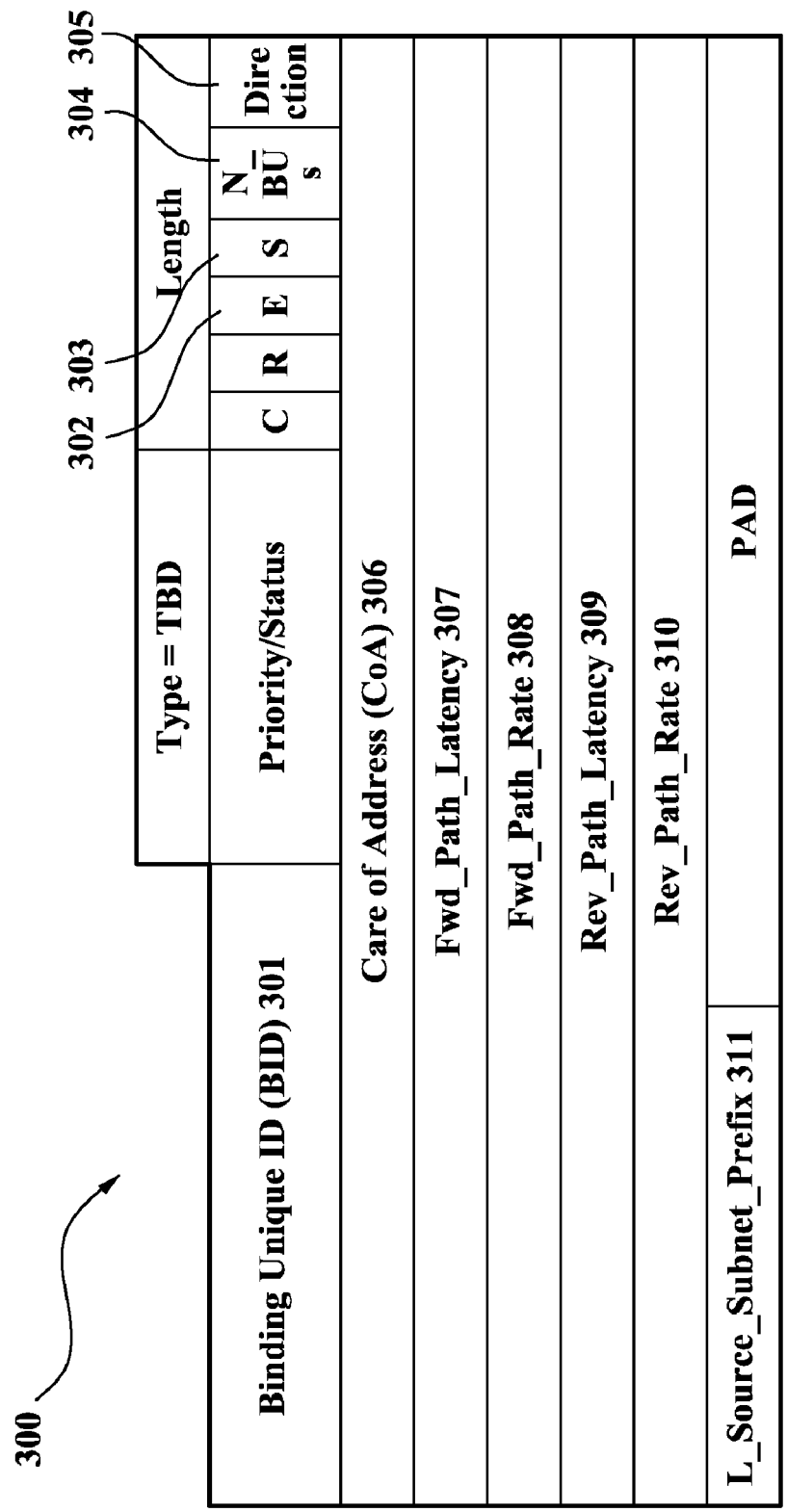
FIG. 3 illustrates a BID sub-option extension of a BU message according to an exemplary embodiment of the present invention.

FIG. 3 illustrates a BID sub-option extension of a BU message according to an exemplary embodiment of the present invention.

In the present exemplary embodiment, an MMT transmits a BU message 300 to either a home agent or a CN via each of a plurality of interfaces to select one interface from a plurality of accessible heterogeneous networks or to perform VHO between heterogeneous networks. In this instance, the BU message 300 uses a BID sub-option extension which is defined in MONAMI6 of IETF, for registration of multiple CoAs.

A BID field 301 includes an identifier to identify a BU message. Also, when using the BID sub-option extension, a one-bit E flag 302 is set to "1". Also, an S flag 303 is set to "1" by a starting router to store quality of service (QoS) information in only a designated path, and is set to "0" by a final router of a destination. In this instance, a default value of the S flag 303 is "0".

An N_BUs field 304 indicates a number of BU messages which are transmitted to the home agent or the CN via each of the plurality of interfaces of the MMT. For example, referring again to FIG. 1, the MMT 150 transmits the BU message to the home agent 142 via the first network 120, and also transmits the BU message to the home agent 142 via the second network 130. In this case, two BU messages are transmitted to the home agent 142 and thus the N_BUs field 304 is set to "10" (binary 2). According to an exemplary embodiment of the present invention, two bits are used for the N_BUs field 304.

A Direction field 305 includes information about a direction to be considered in a selection of binding. According to an exemplary embodiment of the present invention, two bits are used for the Direction field 305. In this case, when the Direction field 305 is "00", it indicates "not used". Also, when the Direction field 305 is "01", it indicates "forward". Also, when the Direction field 305 is "10", it indicates "reverse". Also, when the Direction field 305 is "11", it indicates "bi-directional". For example, referring again to FIG. 1, when at least one of latency and available bandwidth of a forward path, that is, a path in a direction from the MMT 150 to the home agent 142, is more important than at least of latency and available bandwidth of a reverse path, that is, a path in a direction from the home agent 142 to the MMT 150 among two paths between the MMT 150 and the home agent 142, the MMT 150 sets the Direction field 305 to "01" and then transmits the BU message 300 to the home agent 142 via both the first network 120 and the second network 130. In this instance, the two paths include one path using the first network 120, and another path using the second network 130. Also, the home agent 142 selects one of the first network 120 and the second network 130 based on at least one of latency and available bandwidth information of a corresponding path by referring to the Direction field 305.

A CoA field 306 stores a CoA with respect to an interface of the MMT via which the BU message is transmitted. The MMT includes a plurality of interfaces which provides access capability to heterogeneous networks respectively. In this instance, each of the plurality of interfaces includes a CoA of each of the plurality of interfaces. For example, referring again to FIG. 1, it is assumed that the MMT 150 includes two interfaces, that is, a first interface and a second interface. The first interfaces accesses the first network 120, and the second interface accesses the second network 130. Also, each of the first interface and the second interface may acquire a corresponding CoA by using an RA message or DHCP. Specifically, the first interface includes a first CoA, and the second interface includes a second CoA. In this instance, the first BU message, which is transmitted via the first interface, stores the first CoA in the CoA field 306. Also, the second BU message, which is transmitted via the second interface, stores the second CoA in the CoA field 306.

An Fwd_Path_Latency field 307 includes forward path latency information. In this instance, the forward path latency information may indicate information about latency in a forward path, and may be represented in, for example, units of milliseconds.

Referring again to FIG. 1, each of the routers 113, 114, 122, and 141 updates the Fwd_Path_Latency field 307 of the first BU message which the MMT 150 transmits via the first network 120. Specifically, each of the routers 113, 114, 122, and 141 adds its own forward path latency to the Fwd_Path_Latency field 307 of the first BU message which is received by each of the routers 113, 114, 122, and 141. In this case, the Fwd_Path_Latency field 307 of the first BU message, which is transmitted to the home agent 142, stores the forward latency occurring when the MMT 150 performs data communication via the first network 120.

Also, each of the routers 111, 112, 114, 131, and 141 updates the Fwd_Path_Latency field 307 of the second BU message which the MMT 150 transmits via the second network 130. Specifically, each of the routers 111, 112, 114, 131, and 141 adds its own forward path latency to the Fwd_Path_Latency field 307 of the second BU message which is received by each of the routers 111, 112, 114, 131, and 141. In this case, the Fwd_Path_Latency field 307 of the second BU message, which is transmitted to the home agent 142, stores the forward latency occurring when the MMT 150 performs data communication via the second network 130.

Also, an Fwd_Path_Rate field 308 includes forward path bandwidth information. In this instance, the forward path bandwidth information may be represented in, for example, units of megabits per second (Mbps).

Referring again to FIG. 1, each of the routers 113, 114, 122, and 141 updates the Fwd_Path_Rate field 308 of the first BU message which the MMT 150 transmits via the first network 120. Specifically, each of the routers 113, 114, 122, and 141 compares forward path bandwidth information, which is stored in the Fwd_Path_Rate field 308 of the first BU message received by each of the routers 113, 114, 122, and 141, with forward available bandwidth information, which is supported by each of the routers 113, 114, 122, and 141, and updates the Fwd_Path_Rate field 308. In this instance, the path latency information is acquired by adding up latency between every router existing in the path. However, the path bandwidth information uses a smallest value among the available bandwidth between the routers as the available bandwidth for the entire path. Accordingly, when the forward path bandwidth information, stored in the Fwd_Path_Rate field 308 of the received first BU message, is greater than the forward available bandwidth information supported by each of the routers 113, 114, 122, and 141, each of the routers 113, 114, 122, and 141 updates the Fwd_Path_Rate field 308 with information of the forward available bandwidth supported by each of the routers 113, 114, 122, and 141. In this case, the Fwd_Path_Rate field 308 of the first BU message, which is transmitted to the home agent 142, stores the forward available bandwidth when the MMT 150 performs data communication via the first network 120.

Also, each of the routers 111, 112, 114, 131, and 141 updates the Fwd_Path_Rate field 308 of the second BU message which the MMT 150 transmits via the second network 130. Specifically, each of the routers 111, 112, 114, 131, and 141 compares forward path bandwidth information, which is stored in the Fwd_Path_Rate field 308 of the second BU message received by each of the routers 111, 112, 114, 131, and 141, with forward available bandwidth information supported by each of the routers 111, 112, 114, 131, and 141, and updates the Fwd_Path_Rate field 308. For example, when the forward path bandwidth information, stored in the Fwd_Path_ Rate field 308 of the received second BU message, is greater than the forward available bandwidth information supported by each of the routers 111, 112, 114, 131, and 141, each of the routers 111, 112, 114, 131 and 141 updates the Fwd_Path_ Rate field 308 with information of the forward available bandwidth supported by each of the routers 111, 112, 114, 131, and 141. In this case, the Fwd_Path_Rate field 308 of the second BU message, which is transmitted to the home agent 142, stores the forward available bandwidth when the MMT 150 performs data communication via the second network 130.

Also, a Rev_Path_Latency field 309 includes reverse path latency information. In this instance, the reverse path latency information may indicate information about latency in a reverse path, and may be represented in, for example, a unit of "millisecond".

Referring again to FIG. 1, each of the routers 113, 114, 122, and 141 updates the Rev_Path_Latency field 309 of the first BU message which the MMT 150 transmits via the first network 120. Specifically, each of the routers 113, 114, 122, and 141 adds its own reverse path latency to the Rev_Path_Latency field 309 of the first BU message which is received by each of the routers 113, 114, 122, and 141. In this case, the Rev_Path_Latency field 309 of the first BU message, which is transmitted to the home agent 142, stores the reverse latency occurring when the MMT 150 performs data communication via the first network 120.

Also, each of the routers 111, 112, 114, 131, and 141 updates the Rev_Path_Latency field 309 of the second BU message which the MMT 150 transmits via the second network 130. Specifically, each of the routers 111, 112, 114, 131, and 141 adds its own reverse path latency to the Rev_Path_Latency field 309 of the second BU message which is received by each of the routers 111, 112, 114, 131, and 141. In this case, the Rev_Path_Latency field 309 of the second BU message, which is transmitted to the home agent 142, stores the reverse latency occurring when the MMT 150 performs data communication via the second network 130.

Also, a Rev_Path_Rate field 310 includes reverse path bandwidth information. In this instance, the reverse path bandwidth information may indicate information about available bandwidth of the reverse path, and may be represented in, for example, unit of Mbp.

Referring again to FIG. 1, each of the routers 113, 114, 122, and 141 updates the Rev_Path_Rate field 310 of the first BU message which the MMT 150 transmits via the first network 120. Specifically, each of the routers 113, 114, 122, and 141 compares reverse path bandwidth information, which is stored in the Rev_Path_Rate field 310 of the first BU message received by each of the routers 113, 114, 122, and 141, with reverse available bandwidth information supported by each of the routers 113, 114, 122, and 141, and updates the Rev_Path_Rate field 310. In this instance, the path latency information is acquired by adding up latency between every router existing in the reverse path. However, the path bandwidth information uses, as the available bandwidth for the entire path, a smallest value among the available bandwidth between every router. Accordingly, when the reverse path bandwidth information stored in the Rev_Path_Rate field 310 of the received first BU message is greater than the reverse available bandwidth information supported by each of the routers 113, 114, 122, and 141, each of the routers 113, 114, 122, and 141 updates the Rev_Path_Rate field 310 with information of the reverse available bandwidth supported by each of the routers 113, 114, 122, and 141. In this case, the Rev_Path_Rate field 310 of the first BU message, which is transmitted to the home agent 142, stores the reverse available bandwidth when the MMT 150 performs data communication via the first network 120.

Also, each of the routers 111, 112, 114, 131, and 141 updates the Rev_Path_Rate field 310 of the second BU message which the MMT 150 transmits via the second network 130. Specifically, each of the routers 111, 112, 114, 131, and 141 compares reverse path bandwidth information, which is stored in the Rev_Path_Rate field 310 of the second BU message received by each of the routers 111, 112, 114, 131, and 141, with reverse available bandwidth information supported by each of the routers 111, 112, 114, 131, and 141, and updates the Rev_Path_Rate field 310. For example, when the reverse path bandwidth information, which is stored in the Rev_Path_Rate field 310 of the received second BU message, is greater than the reverse available bandwidth information supported by each of the routers 111, 112, 114, 131, and 141, each of the routers 111, 112, 114, 131, and 141 updates the Rev_Path_Rate field 310 with information of the reverse available bandwidth supported by each of the routers 111, 112, 114, 131, and 141. In this case, the Rev_Path_Rate field 310 of the second BU message, which is transmitted to the home agent 142, stores the reverse available bandwidth when the MMT 150 performs data communication via the second network 130.

According to an exemplary embodiment of the present invention, each of the Fwd_Path_Latency field 307, the Fwd_Path_Rate field 308, the Rev_Path_Latency field 309, and the Rev_Path_Rate field 310 may have a size of 32 bits.

Also, an L_Source_Subnet_Prefix field 311 stores the length of the subnet prefix of the CoA 306. In this instance, the L_Source_Subnet_Prefix field 311 may have a size of 8 bits.

FIG. 4 illustrates syntax of data stored in an information server according to an exemplary embodiment of the present invention.

The information server includes an information repository 400. The information repository 400 stores, with respect to at least one source subnet, 1) a subnet prefix of the at least one source subnet, and 2) at least one of path latency information and path bandwidth information about a path from the at least one source subnet to at least one destination subnet. Also, when the information server receives at least one of path latency information and path bandwidth information from a home agent or a CN, the information server stores the received at least one of path latency information and the path bandwidth information in the information repository 400. In this instance, when at least one of the received path latency information and the path bandwidth information is already stored in the information repository 400, the information server updates at least one of the stored path latency information and the path bandwidth information with new information.

The information repository 400 stores a plurality of destination subnets with respect to at least one source subnet. Also, the information repository 400 stores a source subnet prefix 401 with respect to one source subnet. Also, the information repository 400 stores a destination subnet prefix 402 with respect to a destination subnet. In this instance, a source subnet prefix and destination subnet prefix pair identifies one path. Also, the information repository 400 stores path latency information (end-to-end delay) 403, path bandwidth information (available BW) 404, and a time-to-live (TTL) (expiration time) 405 with respect to the identified path. The TTL 405 indicates valid time of at least one of the path latency information 403 and the path bandwidth information 404 of a corresponding path which is stored in the information server. For example, when at least one of the path latency information 403 and the path bandwidth information 404 of the corresponding path is updated, and is also valid for 500 ms, the information server stores the TTL 405 for a period of time corresponding to an addition of the current time and 500 ms until at least one of the path latency information 403 and the path bandwidth information 404 of the corresponding path is updated. Accordingly, when the TTL 405 about at least one of the stored path latency information 403 and the path bandwidth information 404 of the corresponding path is expired, the corresponding information is deleted from the information repository 400.

Figure 5:
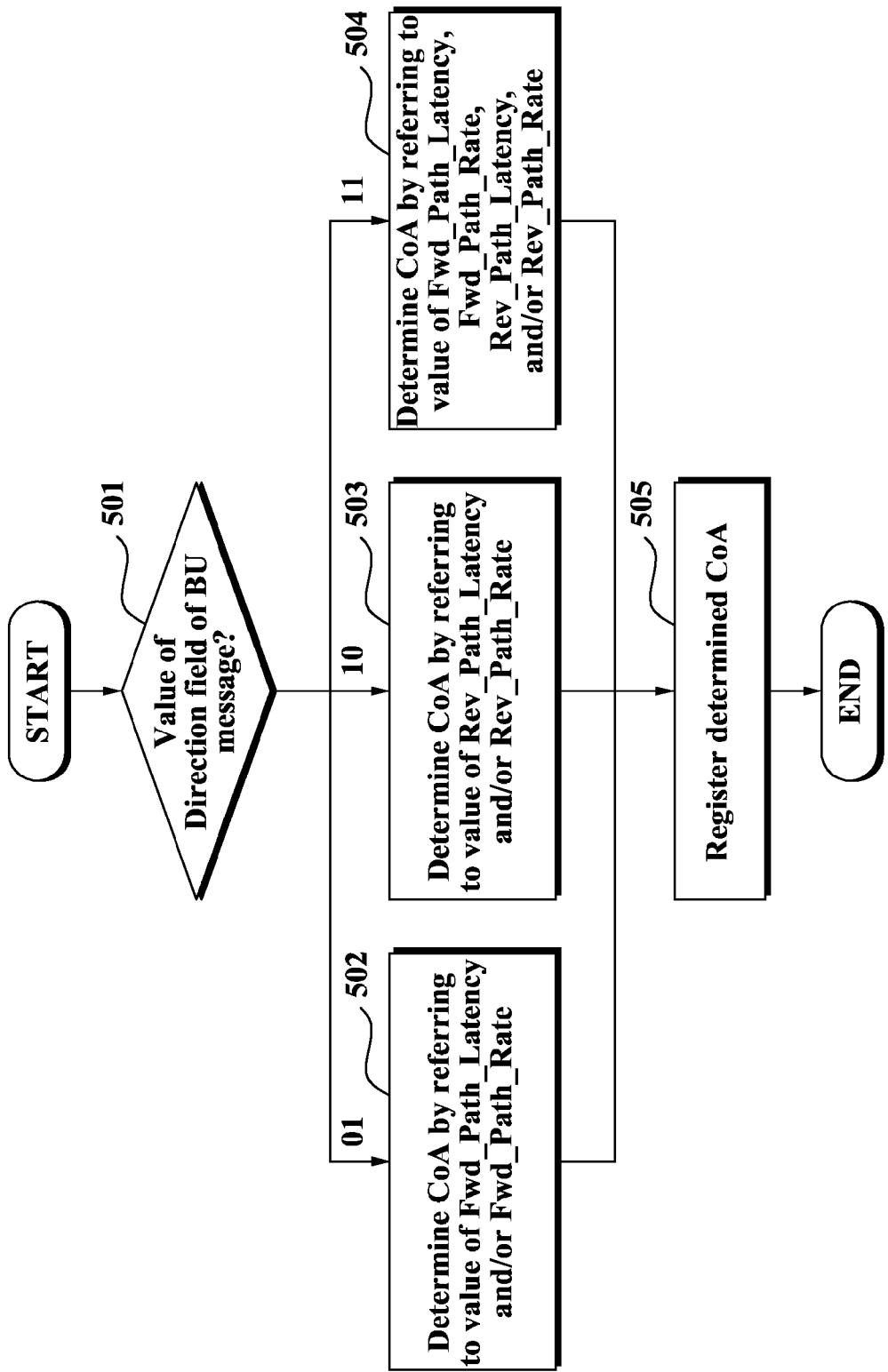
FIG. 5 is a flowchart illustrating a method of selecting a CoA based on a Direction field of a BU message according to an exemplary embodiment of the present invention.

FIG. 5 is a flowchart illustrating a method of selecting a CoA based on a Direction field of a BU message according to an exemplary embodiment of the present invention.

A home agent or a CN determines a CoA with respect to an MMT by referring to path latency information and path bandwidth information, included in each of a plurality of BU messages. In this instance, the plurality of BU messages are received from the MMT via a plurality of paths. Also, the path latency information may include forward path latency information and reverse path latency information. Also, the path bandwidth information may include forward path bandwidth information and reverse path bandwidth information. In this case, the home agent or the CN determines the CoA with respect to the MMT by referring to the Direction field of the BU message. The present exemplary embodiment will be described in detail with reference to FIG. 5.

In operation S501, a home agent or a CN reads a value from a Direction field of each of a plurality of BU messages, which is received from an MMT via a plurality of paths. In this instance, the Direction field of the BU message includes information about a direction to be considered in a selection of binding.

When the value of the Direction field is "01", the home agent or the CN determines the CoA with respect to the MMT by referring to a value of at least one of Fwd_Path_Latency and Fwd_Path_Rate of each of the plurality of BU messages in operation S502. When the value of the Direction field is "01", forward data communication is more important. Accordingly, the home agent or the CN may determine a network which the MMT may use by referring to only forward path latency or forward path bandwidth.

When the value of the Direction field is "10", the home agent or the CN determines the CoA with respect to the MMT by referring to a value of Rev_Path_Latency and/or Rev_Path_Rate of each of the plurality of BU messages in operation S503. When the value of the Direction field is "10", reverse data communication is more important. Accordingly, the home agent or the CN may determine a network which the MMT may use by referring to only reverse path latency or reverse path bandwidth.

When the value of the Direction field is "11", the home agent or the CN determines the CoA with respect to the MMT by referring to a value of Fwd_Path_Latency, Fwd_Path_Rate, Rev_Path_Latency, and/or Rev_Path_Rate of each of the plurality of BU messages in operation S504. When the value of the Direction field is "11", both forward data communication and reverse data communication is important. Accordingly, the home agent or the CN may determine a network which the MMT may use by referring to the path latency or the path bandwidth of both the forward path and the reverse path. In this case, both forward information and reverse information may be considered by using equal weight values.

In operation S505, the home agent or the CN registers the determined CoA. Also, the home agent or the CN transmits a BAck message to the MMT.

Figure 6:
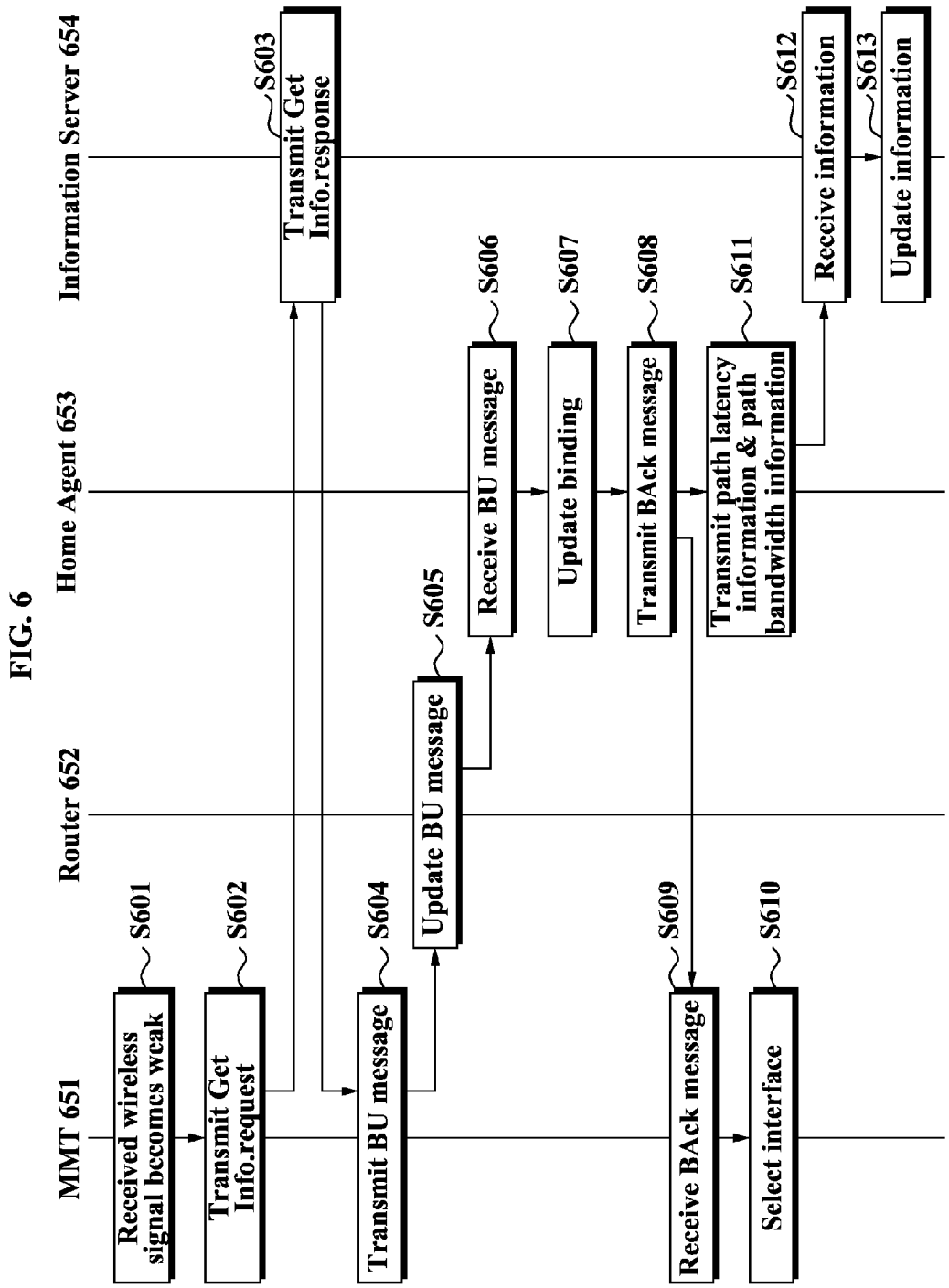
FIG. 6 is a flowchart illustrating a handover operation to a new network when a received signal of a network currently accessed by an MMT becomes weak according to an exemplary embodiment of the present invention.

FIG. 6 is a flowchart illustrating a handover operation to a new network when a received signal of a network currently accessed by an MMT 651 becomes weak, according to an exemplary embodiment of the present invention.

The MMT 651 includes a plurality of interfaces. Each of the plurality of interfaces provides access capability to heterogeneous networks respectively. The MMT 651 selects one interface from the plurality of interfaces and performs wireless data communication by using the selected interface. In this instance, remaining interfaces, excluding the selected interface, are set to a sleep mode.

In operation S601, as the MMT 651 moves, a wireless signal received via a selected interface becomes weak. Referring again to FIG. 1, as the MMT 150 performs data communication using a WLAN corresponding to the second network 130 and then moves away from the AP 132 (i.e., in a rightward direction), a wireless signal received from the AP 132 becomes weak. When the wireless signal becomes weak, the MMT 150 receives a "Link Going Down" event via an MIH.

When the strength of the received wireless signal is less than a predetermined threshold value, the MMT 651 requests an information server 654 for information about a network which another interface provides access capability to in operation S602.

The information server 654 stores, with respect to at least one source subnet, 1) a subnet prefix of each of the at least one source subnet, and 2) at least one of path latency information and path bandwidth information about a path from the at least one source subnet to at least one destination subnet. When describing an exemplary embodiment of the present invention with reference to FIG. 1, the information server 170 stores path latency information and path bandwidth information about each of paths with respect to a source subnet of each of two networks to which the MMT 150 belongs. Information stored in the information server 170 is dynamically updated during an operation of the MMT 150. Also, the information server 170 stores path latency information and path bandwidth information of a path from a source subnet of a first interface of the MMT 150 to a destination subnet of the home agent 142 via the first network 120. Also, the information server 170 stores path latency information and path bandwidth information of another path from a source subnet of a second interface of the MMT 150 to the destination subnet of the home agent 142 via the second network 130.

In operation S603, the information server 654 transmits, in response to a request from a multi-mode terminal, to the MMT 651, 1) the subnet prefix of each of the at least one source subject, and 2) at least one of the path latency information and the path bandwidth information about the path from the source subnet to the at least one destination subnet. In this instance, 1) and 2) are stored in the information server 654 in association with the source subnet of the MMT 651. Also, information which the MMT 651 receives from the information server 654 in operation S603 may include information about latency from the source subnet of the MMT 651 to the destination subnet, with respect to each of networks which other interfaces, excluding the interface currently used by the MMT 651, provide access capability to. Also, the information which the MMT 651 receives from the information server 654 may include available bandwidth from the source subnet of the MMT 651 to the destination subnet with respect to each of networks which the other interfaces provide the access capability to.

Hereinafter, an exemplary embodiment of the present invention will be described with reference to FIG. 1. The MMT 150 selects a second interface, and performs wireless data communication by using the selected second network 130. In this case, in response to an information request from the MMT 150, the information server 170 transmits path latency information and path bandwidth information of a currently unselected first path using the first interface of the MMT 150, to the MMT 150. According to another exemplary embodiment of the present invention, in response to an information request from the MMT 150, the information server 170 transmits to the MMT 150 1) path latency information and path bandwidth information of a first path using a first interface of the MMT 150, and 2) path latency information and path bandwidth information of a second path using a second path of the MMT 150. Specifically, irrespective of whether a corresponding interface is selected, the information server 170 transmits path latency information and path bandwidth information of each of paths, associated with all the interfaces of the MMT 150, to the MMT 150.

In operation S604, the MMT 651 selects an appropriate interface based on information received from the information server 654. Referring to FIG. 1, the MMT 150 selects a first interface of the WiBro network 120 instead of a second interface of the WLAN 130 currently in use. Also, the MMT 150 transmits a BU message including a CoA to the home agent 142. In this instance, the CoA is acquired with respect to the selected interface. When the appropriate interface is selected based on the information received from the information server 170, a method of immediately using a new interface in the MMT 150, and a method of transmitting a BU message to the home agent 142 and receiving a BAck message and then using the new interface may be used.

According to a first embodiment, when the appropriate interface is selected based on information received from the information server 654, the MMT 651 converts the newly selected interface into a wake-up mode and performs communication by using the newly selected interface. In this instance, the MMT 651 converts a previously used interface into a sleep mode. Accordingly, when the MMT 651 moves in a heterogeneous network environment, seamless VHO may be quickly performed. Also, the MMT 651 transmits a BU message to the home agent 653. In this instance, the MMT 651 transmits the BU message via only the newly selected interface. For example, when the MMT 651 uses the second interface of the WLAN and a signal of the WLAN becomes weak due to the movement of the MMT 651, the MMT 651 selects the first interface of the WiBro network based on information received from the information server 654. Accordingly, the MMT 651 converts the first interface into a wake-up mode, and converts the second interface into a sleep mode. Also, the MMT 651 transmits a BU message to the home agent 653 via the first interface. In this instance, the MMT 651 does not transmit the BU message via the second interface.

According to a second embodiment, the MMT 651 transmits a BU message to the home agent 653 via a newly selected interface, while continuously using a currently used interface. Also, when a success BAck message is received from the home agent 653 in operation S609, the MMT 651 converts the newly selected interface into a wake-up mode and performs communication using the newly selected interface in operation S610. Also, the MMT 651 converts the previously used interface into a sleep mode. Specifically, handover is completed.

For example, when the MMT 651 uses the second interface of the WLAN and a signal of the WLAN becomes weak due to the movement of the MMT 651, the MMT 651 selects the first interface of the WiBro network based on information received from the information server 654. Accordingly, the MMT 651 transmits the BU message to the home agent 653 via the first interface while continuously using the second interface. Also, the MMT 651 may transmit the BU message using the second interface or without using the second interface. Also, when the success BAck message is received from the home agent 653, the MMT 651 converts the first interface into a wake-up mode, and performs communication by using the first interface. In this case, the MMT 651 converts the second interface into a sleep mode.

In operation S604, the MMT 651 may transmit the BU message by using a BID, which is defined in MONAMI6 of IETF for registration of multiple CoAs. Also, the MMT 651 may transmit the BU message by using a BID sub-option extension. In this instance, the BU message includes an L_Source_Subnet_Prefix field, an N_BUs field, a Direction field, an E field, and the like. Also, the BU message includes a Path_Latency field and a Path_Rate field as the BID sub-option extension. According to an exemplary embodiment of the present invention, the Path_Latency field and the Path_Rate field may be subdivided into an Fwd_Path_Latency field, a Rev_Path_Latency field, an Fwd_Path_Rate field, and a Rev_Path_Rate field. Also, the BU message includes a CoA with respect to an interface via which the BU message is transmitted.

In operation S605, a router 652 updates the received BU message. The received BU message includes at least one of path latency information and path bandwidth information as the BID sub-option extension of MONAMI6. Also, the router 652 updates at least one of the path latency information and the path bandwidth information of the BU message.

In operation S606, the home agent 653 receives the updated BU message from the router 652.

In operation S607, the home agent 653 updates binding corresponding to the received BU message. For example, when the MMT 651 uses the second interface of the WLAN and then selects the first interface of the WiBro network based on information received from the information server 654 and transmits the BU message via the selected first interface, the home agent 653 performs binding with respect to a first CoA of the first interface.

In operation S608, the home agent 653 transmits a BAck message to the MMT 651. When the binding succeeds, the home agent 653 transmits a success BAck message to the MMT 651. Conversely, when the binding fails, the home agent 653 transmits a failure BAck message to the MMT 651.

In operation S611, the home agent 653 transmits path latency information and path bandwidth information, included in the received BU message, to the information server 654.

In operation S612, the information server 654 receives a source subnet prefix, a destination subnet prefix, path latency information, and path bandwidth information from the information server 654. In operation S613, the information server 654 stores the received path latency information and the path bandwidth information in an information repository. Also, in operation S613, the information server 654 updates path latency information and path bandwidth information of a path from a source subnet to a destination subnet with respect to a source subnet prefix and destination subnet prefix pair.

In the present exemplary embodiment, the MMT 651 selects an appropriate interface based on information received from the information server 654, and transmits a BU message via only the selected interface. Even in this case, the router 652 updates path latency information and path bandwidth information of the BU message and transfers the updated path latency information and the path bandwidth information to the home agent 653. In this case, the home agent 653 transfers the received path latency information and the path bandwidth information to the information server 654. Accordingly, the information server 654 stores the more recently updated path latency information and the path bandwidth information.

When no appropriate interface is selected based on information received from the information server 654 in operation S603, the MMT 651 transmits the BU message to the home agent 653 via each of the plurality of interfaces of the MMT 651 in operation S604. In this instance, each of the plurality of BU messages includes at least one of 1) a length of a subnet prefix of a CoA wherein the CoA is acquired for an interface to transmit the BU message, 2) a number of BU messages which are transmitted to the home agent 653 via the plurality of interfaces, and 3) information about a direction to be considered in a selection of binding. In this case, operations after operation S604 may be performed the same as in operations S205 through S213.

Figure 7:
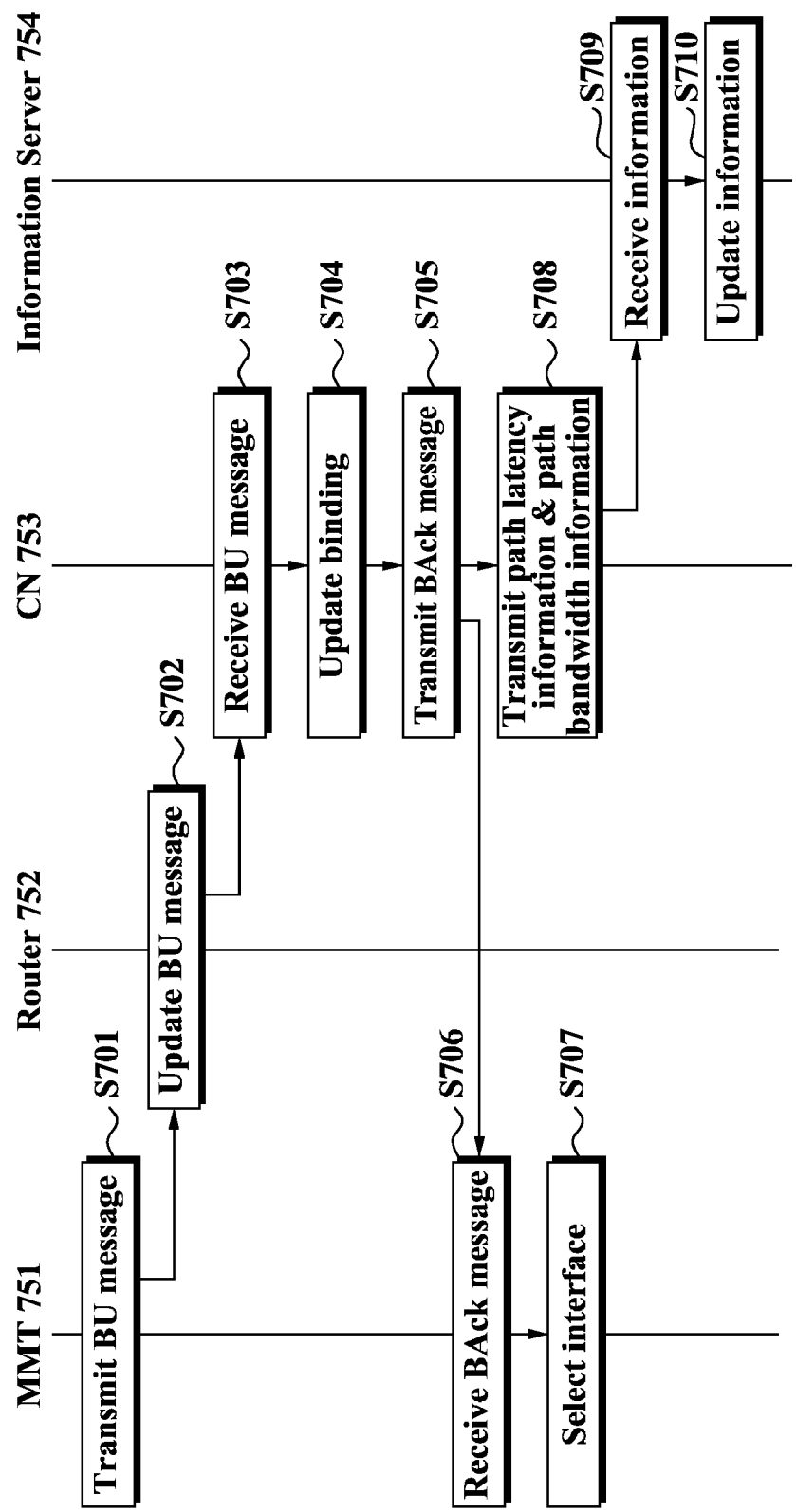
FIG. 7 is a flowchart illustrating a handover operation to optimize a routing path between an MMT and a CN communicating with the MMT according to an exemplary embodiment of the present invention.

FIG. 7 is a flowchart illustrating a handover operation after a routing optimization between an MMT 751 and a CN 753 communicating with the MMT 751 is performed according to an exemplary embodiment of the present invention.

A method enabling an MMT to directly communicate with a CN without using a home agent in an MIP is referred to as "routing optimization". The MMT may selectively perform the routing optimization at an appropriate point in time after a home agent terminates updating of binding.

In operation S701, the MMT 751 transmits a BU message to the CN 753 via a router 752, utilizing an interface which is currently used for communication. The MMT 751 may use an MIP to process the BU message. Referring to FIG. 1, the MMT 150 includes the first interface with respect to the first network (WiBro network) 120 and the second interface with respect to the second network (WLAN) 130. In the present exemplary embodiment, the MMT 150 communicates with the CN 160 via the first network (WiBro network) 120 using the first interface. In this instance, the second interface is set to a sleep mode. Also, the MMT 150 transmits the BU message to the CN 160 via the first interface of the MMT 150 to optimize the path which is currently used to communicate with the CN 160. Also, the MMT 150 transmits a first BU message to the CN 160 via the first interface and the first network 120.

In this instance, the MMT 751 may use MONAMI6 of IETF which is used for registration of multiple CoAs. Also, the MMT 751 transmits a BU message by using a BID sub-option extension. The BU message includes an L_Source_Subnet_Prefix field, an N_BUs field, a Direction field, an E field, and the like. Also, the BU message includes a Path_Latency field and a Path_Rate field as the BID sub-option extension. According to an exemplary embodiment of the present invention, the Path_Latency field and the Path_Rate field may be subdivided into an Fwd_Path_Latency field, a Rev_Path_Latency field, an Fwd_Path_Rate field, and a Rev_Path_Rate field. Also, the BU message includes a CoA with respect to an interface via which the BU message is transmitted.

In operation S702, the router 752 updates the received BU message. The received BU message includes at least one of path latency information and path bandwidth information as the BID sub-option extension of MONAMI6. Also, the router 752 updates at least one of the path latency information and the path bandwidth information of the BU message. Also, the router 752 transmits the updated BU message to a next hop. The BU message updated by the router 752 existing in the path is transferred to a CN 753.

In operation S703, the CN 753 receives the BU message which is transmitted from the MMT 751. Referring to FIG. 1, the CN 160 receives the first BU message, which is transmitted from the MMT 150 via the first network 120. In this instance, each of the first BU message and the second BU message includes a Path_Latency field and a Path_Rate field. Also, the first BU message includes a first CoA with respect to the first interface of the MMT 150 via which the first BU message is transmitted.

In operation S704, the CN 753 selects a CoA with respect to the MMT 751 based on at least one of the Path_Latency field and the Path_Rate field of the received BU message, and updates binding.

In operation S705, the CN 753 transmits a BAck message to the MMT 751.

In operation S706, the MMT 751 receives the BAck message from the CN 753.

In operation S707, the MMT 751 selects an interface which receives a success BAck message from the CN 753, and performs communication using the selected interface.

In operation S708, the CN 753 transmits path latency information and path bandwidth information, which is included in the received BU message, to the information server 754. Referring to FIG. 1, the CN 160 receives the BU message from the MMT 150, and also transmits path latency information and path bandwidth information of the BU message to the information server 170. Also, the information server 170 transmits data of the Path_Latency field and data of the Path_Rate field to the information server 170 together with the source subnet prefix and the destination subnet prefix. According to an exemplary embodiment of the present invention, path latency information and path bandwidth information of a path from a source subnet to a destination subnet may include forward information and reverse information respectively.

In operation S709, the information server 754 receives a source subnet prefix, a destination subnet prefix, path latency information, and path bandwidth information from the CN 753.

In operation S710, the information server 754 updates an information repository by referring to the received information with, for example, the path latency information, the path bandwidth information, and the like. Also, the information server 754 updates path latency information and path bandwidth information of a path from the source subnet and to the destination subnet with respect to a source subnet prefix and destination subnet prefix pair.

Figure 8:
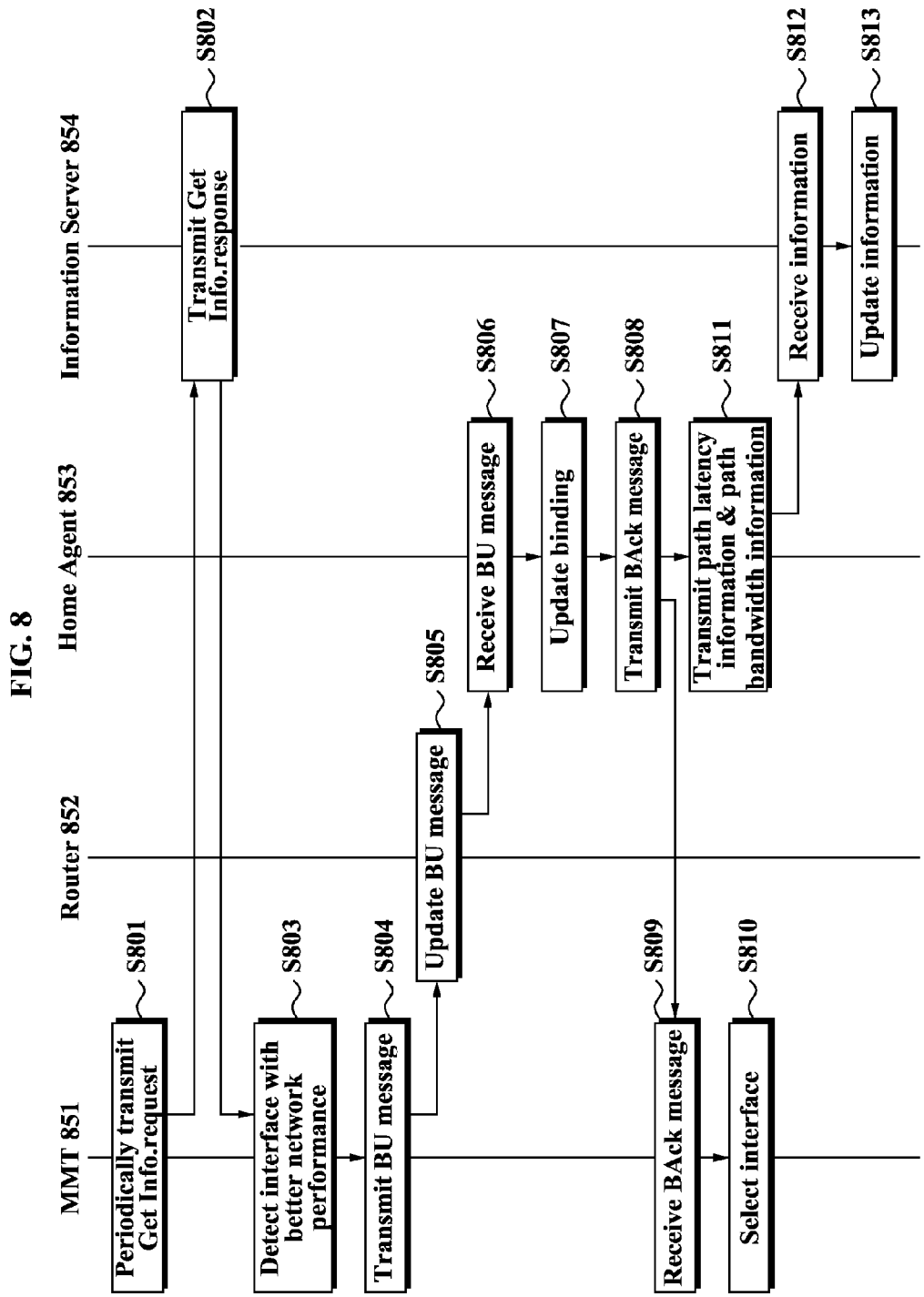
FIG. 8 is a flowchart illustrating an operation of detecting another network with a better function than a network currently accessed by an MMT, and performing handover to the detected network according to an exemplary embodiment of the present invention.

FIG. 8 is a flowchart illustrating an operation of detecting another network with a better function than a network currently accessed by an MMT 851, and performing handover to the detected network according to an exemplary embodiment of the present invention.

The MMT 851 includes a plurality of interfaces. Each of the plurality of interfaces provides access capability to heterogeneous networks respectively. In this instance, one interface is selected from the plurality of interfaces by the MMT 851 and operates in a wake-up mode. Also, the MMT 851 performs communication using the selected interface. In this instance, remaining interfaces, excluding the selected interface, are set to a sleep mode.

In operation S801, the MMT 851 periodically requests an information server 854 for information about each of the heterogeneous networks which the plurality of interfaces of the MMT 851 provide the access capability to.

In this instance, the information server 854 stores, with respect to at least one source subnet, 1) a subnet prefix of each of the at least one source subnet, and 2) at least one of path latency information and path bandwidth information about a path from the at least one source subnet to at least one destination subnet. When describing an exemplary embodiment of the present invention with reference to FIG. 1, the information server 170 stores path latency information and path bandwidth information about each of paths with respect to a source subnet of each of two networks to which the MMT 150 belongs. Information stored in the information server 170 is dynamically updated during an operation of the MMT 150. Also, the information server 170 stores path latency information and path bandwidth information of a path from a source subnet of a first interface of the MMT 150 to a destination subnet of the home agent 142 via the first network 120. Also, the information server 170 stores path latency information and path bandwidth information of another path from a source subnet of a second interface of the MMT 150 to the destination subnet of the home agent 142 via the second network 130.

In operation S802, in response to the information request from the MMT 851, the information server 854 transmits path latency information and path bandwidth information to the MMT 851 with respect to each of the networks which are capable of being accessed via the plurality of interfaces of the MMT 851. Also, the information server 854 may transmit information about latency from a subnet of the MMT 851 to the destination subnet to the MMT 851, with respect to each of the networks which the plurality of interfaces of the MMT 851 provide the access capability to. Also, the information server 854 may transmit available bandwidth from the subnet of the MMT 851 to the destination subnet to the MMT 851, with respect to each of the networks which the plurality of interfaces of the MMT 851 provide the access capability to.

Hereinafter, an exemplary embodiment of the present invention will be described with reference to FIG. 1. The MMT 150 selects a second interface, and performs wireless data communication using the selected second network 130. In this case, in response to an information request from the MMT 150, the information server 170 transmits to the MMT 150 1) path latency information and path bandwidth information of a first path using the first interface of the MMT 150, and 2) path latency information and path bandwidth information of a second path using the second interface of the MMT 150. In this instance, a subnet prefix of a source subnet is also transmitted from the information server 170 to the MMT 150.

In operation S803, the MMT 851 detects an interface with a better network performance than a currently used interface based on information received from the information server 854. When the interface with the better network performance is undetected, the MMT 851 continuously uses the currently used interface and performs operation S801 again after a predetermined period of time elapses.

Conversely, when the interface with the better network performance than the currently used interface is detected in operation S803, the MMT 851 generates a new CoA (nCoA) with respect to the detected interface by using a subnet prefix which is stored in the information server 854. Also, when the MMT 851 receives path latency information and path bandwidth information from the information server 854, the MMT 851 also receives the subnet prefix with respect to the source subnet of the path. Accordingly, the MMT 851 may generate the nCoA by using the subnet prefix. According to the present exemplary embodiment, a router discovery (RD) procedure of an MIP is omitted and thus handover may be quickly performed. Referring to FIG. 1, the MMT 150 selects the second interface of the second network (WLAN) 130 instead of the currently used first interface of the first network (WiBro network) 120.

When the interface with the better network function than the currently used interface is detected based on information received from the information server 854, a method of immediately using a new interface in the MMT 851, and a method of transmitting a BU message to the home agent 853 and receiving a BAck message and then using a new interface may be used.

According to a first embodiment, when the interface with the better network function is detected based on information received from the information server 854, the MMT 851 converts the detected interface into a wake-up mode, and performs communication using the detected interface. In this instance, the MMT 851 converts a previously used interface into a sleep mode. Accordingly, when the better network is available in a heterogeneous network environment, handover to the better network may be performed without a user noticing and thereby a wireless data communication service using the better network may be provided for the user. Next, the MMT 851 transmits a BU message to the home agent 853. In this instance, the MMT 851 transmits the BU message via only the newly detected interface. For example, the MMT 851 uses the first interface of the WiBro network and later selects the second interface of the WLAN based on information received from the information server 854. Accordingly, the MMT 851 converts the second interface into a wake-up mode, and converts the first interface into a sleep mode. Also, the MMT 851 transmits a BU message to the home agent 853 via the second interface. In this instance, the MMT 851 does not transmit the BU message via the first interface.

According to a second embodiment, the MMT 851 transmits a BU message to the home agent 853 via a newly selected interface, while continuously using a currently used interface. Also, when a success BAck message is received from the home agent 853 in operation S809, the MMT 851 converts the newly selected interface into a wake-up mode and performs communication using the newly selected interface in operation S810. Also, the MMT 851 converts the previously used interface into a sleep mode. Specifically, handover is completed.

In operation S804, the MMT 851 transmits the BU message, including the nCoA acquired with respect to the newly selected interface, to the home agent 853. In operation S804, the MMT 851 may transmit the BU message by using MONAMI6 of IETF which is used for registration of multiple CoAs. Also, the MMT 851 transmits a BU message by using a BID sub-option extension. In this instance, the BU message includes an L_Source_Subnet_Prefix field, an N_BUs field, a Direction field, an E field, and the like. Also, the BU message includes a Path_Latency field and a Path_Rate field as the BID sub-option extension. According to an exemplary embodiment of the present invention, the Path_Latency field and the Path_Rate field may be subdivided into an Fwd_Path_Latency field, a Rev_Path_Latency field, an Fwd_Path_Rate field, and a Rev_Path_Rate field. Also, the BU message includes a CoA with respect to an interface via which the BU message is transmitted.

In operation S805, a router 852 updates the received BU message. The received BU message includes at least one of path latency information and path bandwidth information as the BID sub-option extension of MONAMI6. Also, the router 852 updates at least one of the path latency information and the path bandwidth information of the BU message.

In operation S806, the home agent 853 receives the BU message from the MMT 851.

In operation S807, the home agent 853 updates binding corresponding to the received BU message. For example, when the MMT 851 uses the first interface of the WiBro network and then selects the second interface of the WLAN based on information received from the information server 854 and transmits the BU message via the selected second interface, the home agent 853 performs binding with respect to a second CoA of the second interface.

In operation S808, the home agent 853 transmits a BAck message to the MMT 851. When the binding succeeds, the home agent 853 transmits a success BAck message to the MMT 851. Conversely, when the binding fails, the home agent 853 transmits a failure BAck message to the MMT 851.

In operation S811, the home agent 853 transmits path latency information and path bandwidth information, included in the received BU message, to the information server 854.

In operation S812, the information server 854 receives a source subnet prefix, a destination subnet prefix, path latency information, and path bandwidth information from the information server 854. In operation S813, the information server 854 stores the received path latency information and the path bandwidth information in an information repository. Also, in operation S813, the information server 854 updates path latency information and path bandwidth information of a path from a source subnet to a destination subnet with respect to a source subnet prefix and destination subnet prefix pair.

In the present exemplary embodiment, the router 852 updates path latency information and path bandwidth information of a BU message, and transfers the updated path latency information and the path bandwidth information to the home agent 853. Also, the home agent 853 transfers the received path latency information and the path bandwidth information to the information server 854. Accordingly, the information server 854 stores the more updated path latency information and the path bandwidth information.

According to an exemplary embodiment of the present invention, the router 852 may forward a packet to a new router by referring to address information of the new router of the MMT 851 received from the information server 854. In this instance, the packet includes the MMT 851 as a destination. Referring to FIG. 1, the MMT 150 performs communication by using the first network (WiBro network) 120 and then performs handover to the second network (WLAN) 130 based on information received from the information server 170. In this instance, when all information associated with the handover is not updated throughout the entire network, a packet using an old CoA (oCoA) of the MMT 150 as a destination is transferred to the router 122. In this instance, the oCoA is an address that the MMT 150 previously used in the first network (WiBro network) 120. The router 122 forwards the packet to the new router 131 of the MMT 150. Accordingly, even though a network previously accessed by the MMT 150 is unstable and thereby the access is disconnected before the handover procedure is completed, the packet using the MMT 150 as the destination is normally transferred via the previous network through the above forwarding. In this instance, a tunneling technique may be used for the forwarding.

According to another exemplary embodiment of the present invention, it is possible to reduce tunneling overhead associated with forwarding of a packet by using a crossover router. When the crossover router receives a binding request about a second network from an MMT and then receives a first packet via a first network from a CN of the MMT, the first packet is encapsulated and then transmitted to the MMT via the second network. In this instance, the second network has a better network performance than the first network currently accessed by the MMT.

For example, an MMT detects a WLAN while the MMT accesses a WiBro network and performs communication by using the WiBro network. The MMT establishes an L2 connection to the detected WLAN and transmits a BU message to a home agent. A router receives the BU message. A crossover router recognizes that the MMT has transmitted a binding request for another WLAN with a better network than the currently accessed WiBro network. Also, the BU message is transferred to a next hop and finally transferred to the home agent. Before a success BAck message is received from the home agent, a first packet is received from a CN of the MMT. In this instance, the first packet includes a CoA with respect to a WiBro interface of the MMT as a destination address. Also, the crossover router encapsulates the first packet and transmits the encapsulated first packet to the MMT by using a CoA with respect to a WLAN interface of the MMT as a destination address. Through the above process, the MMT may quickly receive a service by using the better network. Also, the MMT decapsulates the encapsulated first packed and thereby interprets the first packet. When a success BAck message with respect to the second network, for example, the WLAN, is received from the home agent, the crossover router immediately stops transmitting of the first packet via the first network, for example, the WiBro network.

The router 122 acquires address information of the new router 131 from the information server 170.

Figure 9:
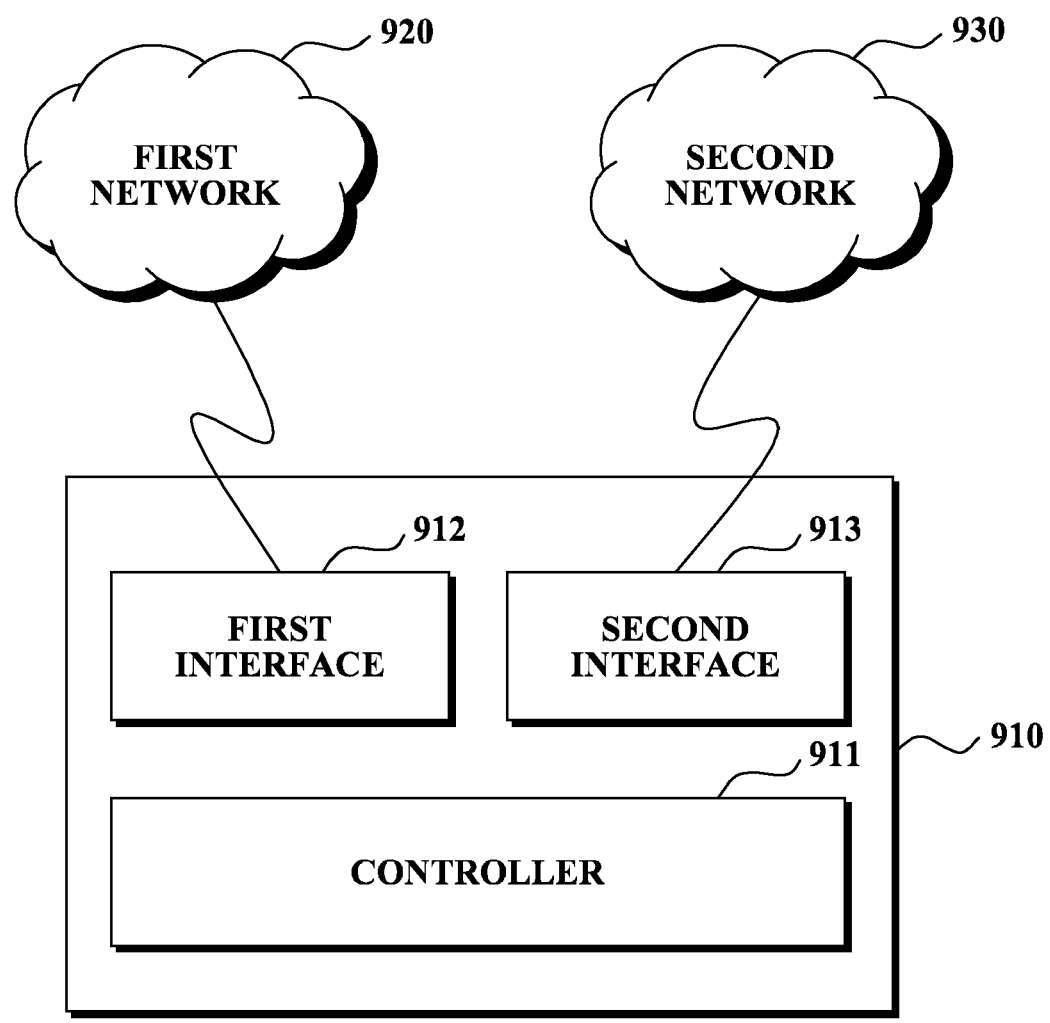
FIG. 9 is a block diagram illustrating an MMT according to an exemplary embodiment of the present invention.

FIG. 9 is a block diagram illustrating an MMT 910 according to an exemplary embodiment of the present invention.

The MMT 910 includes a controller 911, a first interface 912, and a second interface 913.

The first interface 912 and the second interface 913 provide access capability to heterogeneous networks respectively. Specifically, the first interface 912 provides the access capability to a first network 920. In this instance, the first network 920 may be a WiBro network. Also, the second interface 913 provides the access capability to a second network 930. In this instance, the second network 930 may be a WLAN. The MMT 910 may access both the first network 920 and the second network 930 by using the first interface 912 and the second interface 913, respectively. In this instance, the first network 920 and the second network 930 are heterogeneous networks.

The controller 911 transmits a BU message to a home agent or a CN via each of the first interface 912 and the second interface 913. In this instance, the BU message includes path latency information and path bandwidth information. The path latency information and the path bandwidth information of the BU message is updated by a router which is located in a path to the home agent or the CN. Also, the home agent or the CN reports the path latency information and the path bandwidth information of the received BU message to an information server, so that the information server may store the path latency information and the path bandwidth information. Accordingly, the information server stores the path latency information and the path bandwidth information which is dynamically updated with respect to each path. Also, the MMT 910 may quickly perform seamless VHO by using the stored path latency information and the path bandwidth information.

According to an exemplary embodiment of the present invention, the same packet may be received via at least two of a plurality of interfaces of the MMT 910. In this case, data with respect to a path of each of remaining interfaces, excluding the selected interface, is received. Accordingly, the remaining interfaces, excluding the selected interface, are converted into a sleep mode.

Figure 10:
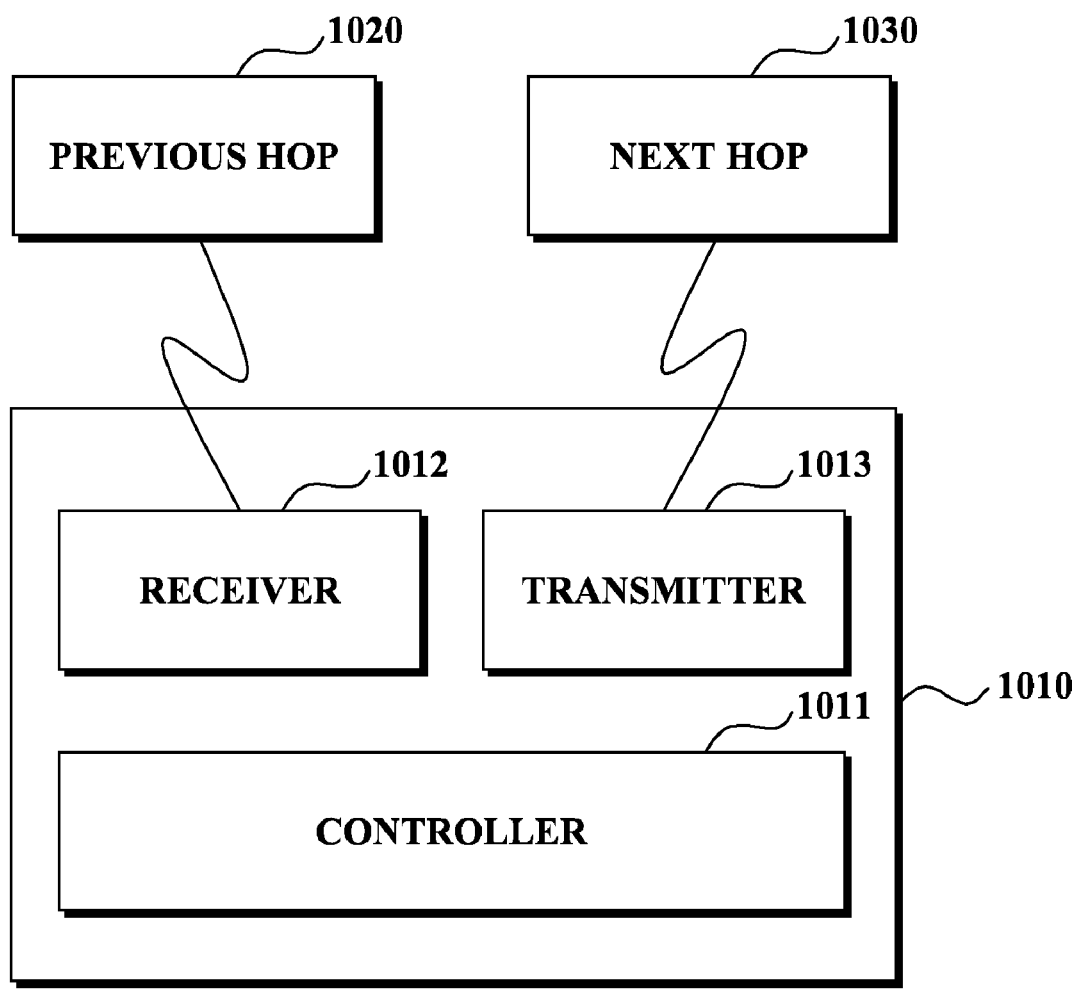
FIG. 10 is a block diagram illustrating a router according to an exemplary embodiment of the present invention.

FIG. 10 is a block diagram illustrating a router 1010 according to an exemplary embodiment of the present invention.

The router 1010 according to the present exemplary embodiment includes a controller 1011, a receiver 1012, and a transmitter 1013. Also, the router 1010 receives a message from a previous hop 1020 and transmits the message to a next hop 1030. In this instance, the router 1010 includes an access control router (ACR) and an access router (AR).

The receiver 1012 receives a BU message from the previous hop 1020. In this instance, the previous hop 1020 may be a base station, such as an AP, an RAS, and the like. Also, the previous hop 1020 may be another router. Also, the BU message includes at least one of path latency information and path bandwidth information as a BID sub-option extension of MONAMI6. Also, the path latency information of the BU message may include forward path latency information and reverse path latency information. Also, the path bandwidth information of the BU message may include forward path bandwidth information and reverse path bandwidth information.

The controller 1011 updates at least one of the path latency information and the path bandwidth information of the BU message. Also, the controller 1011 adds path latency, caused by the router 1010, to the path latency information of the BU message. Also, the controller 1011 compares the path bandwidth information of the BU message with available bandwidth supported by the router 1010 and updates the path bandwidth information.

The transmitter 1013 transmits the updated BU message to the next hop 1030.

Figure 11:
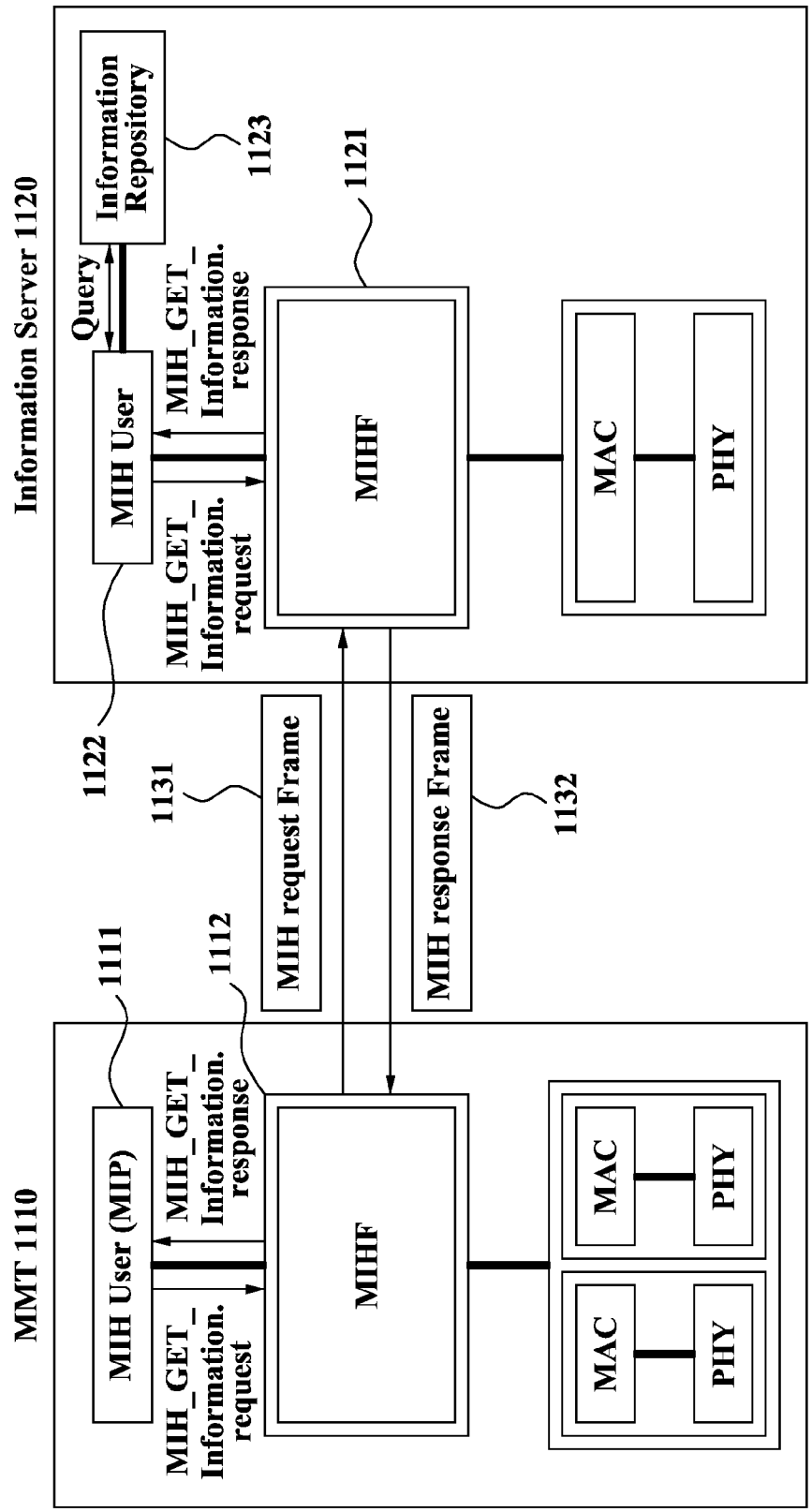
FIG. 11 illustrates communication between an MMT and an information server for each communication layer according to an exemplary embodiment of the present invention.

FIG. 11 illustrates communication between an MMT 1110 and an information server 1120 for each communication layer according to an exemplary embodiment of the present invention.

Each of the MMT 1110 and the information server 1120 includes a physical (PHY) layer, a Media Access Control (MAC) layer, a Media Independent Handover Function (MIHF) layer 1112 or 1121, and a MIH User layer 1111 or 1122.

In this instance, an MIP is used for the MIH User layer 1111 in the MMT 1110. When a MIH_GET_Information.request is transferred from the MIP 1111 of the MMT 1110 to the MIHF layer 1112 of the MMT 1110, the MIHF layer 1112 transmits an MIH request frame 1131 to the MIHF layer 1121 of the information server 1120. In this case, the MIHF layer 1121 transfers the MIH_GET_Information.request to the MIH User layer 1122. Also, the MIH User layer 1122 responds with a MIH_GET_Information.response to the MIHF layer 1121. In this instance, the MIH_GET_Information.response is acquired by referring to an information repository 1123. The information repository 1123 stores, with respect to at least one source subnet, 1) a subnet prefix of each of the at least one source subnet, and 2) at least one of path latency information and path bandwidth information about a path from the at least one source subnet to at least one destination subnet. The MIHF layer 1121 transmits an MIH response frame 1132 to the MIHF layer 1112. Also, the MIHF layer 1122 responds to the MIH response frame 1132 with an MIH_GET_Information.response to the MIH User layer 1111.

The above-described exemplary embodiments of the present invention have been described based on communication environments, such as MIP, MIH, and the like. However, the present invention is not limited thereto and the present invention may be applied in various types of mobile communication environments.

The above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the exemplary embodiments of the present invention, there is provided a method and apparatus which can quickly perform VHO when an MMT moves in a data communication environment where heterogeneous networks are present.

Also, according to the exemplary embodiments of the present invention, there is provided a method and apparatus wherein an MMT can acquire path latency information and path bandwidth information of each of available heterogeneous networks in a data communication environment where the heterogeneous networks are present. In this instance, it is possible to enable the MMT to select an optimal network by using the path latency information and the path bandwidth information of each of the heterogeneous networks and to use the selected optimal network.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A multi-mode terminal comprising:
   a plurality of interfaces which provide access capability to a plurality of heterogeneous networks; and
   a controller which transmits a plurality of binding update (BU) messages to a home agent via the plurality of interfaces,
   wherein the controller transmits each of the plurality of the BU messages to the home agent via a corresponding interface of the plurality of interfaces, and
   wherein an interface of the plurality of interfaces receives a success binding acknowledge message from the home agent and the remainder of the plurality of interfaces receives a failure binding acknowledgement message from the home agent, and the controller selects the interface receiving the success binding acknowledgement message, among the plurality of interfaces, and performs communication using the selected interface.

2. The multi-mode terminal of claim 1, wherein the controller transmits the BU messages to the home agent via the plurality of interfaces when the multi-mode terminal is powered on.

3. The multi-mode terminal of claim 2, wherein each of the plurality of interfaces establishes a Layer 2 connection to a corresponding network of the plurality of heterogeneous networks when the multi-mode terminal is powered on.

4. The multi-mode terminal of claim 3, wherein the controller acquires a care-of address (CoA) with respect to each of the plurality of interfaces.

5. The multi-mode terminal of claim 2, wherein each of the BU messages comprises a care-of address (CoA) with respect to a corresponding interface, among the plurality of interfaces, via which the BU message is transmitted.

6. The multi-mode terminal of claim 5, wherein each of the BU messages further comprises a length of a subnet prefix of the CoA.

7. The multi-mode terminal of claim 2, wherein each of the BU messages comprises a number of BU messages which are transmitted to the home agent via the plurality of interfaces.

8. The multi-mode terminal of claim 2, wherein each of the BU messages comprises information about a direction to be considered in a selection of binding.

9. A multi-mode terminal comprising:
   a plurality of interfaces which provide access capability to a plurality of heterogeneous networks, wherein remaining interfaces, excluding a selected first interface, among the plurality of interfaces, are set to a sleep mode; and
   a controller which requests, via the selected first interface, an information server for first information about each of heterogeneous networks, among the plurality of heterogeneous networks, to which the remaining interfaces provide the access capability, if a strength of a wireless signal received via the selected first interface becomes less than a threshold value,
   wherein the first information comprises information of a path from a source subnet of each of the remaining interfaces of the multi-mode terminal to a destination subnet of a home agent with respect to a corresponding network of the heterogeneous networks to which the remaining interfaces provide the access capability.

10. The multi-mode terminal of claim 9, wherein the controller selects a second interface, among the remaining interfaces, based on the first information received from the information server.

11. The multi-mode terminal of claim 10, wherein the first information comprises information regarding latency from the source subnet of the multi-mode terminal to the destination subnet, with respect to each of the heterogeneous networks to which the remaining interfaces provide the access capability.

12. The multi-mode terminal of claim 10, wherein the first information comprises information regarding available bandwidth from the source subnet of the multi-mode terminal to the destination subnet, with respect to each of the heterogeneous networks to which the remaining interfaces provide the access capability.

13. The multi-mode terminal of claim 10, wherein the controller transmits a binding update (BU) message to a home agent, and the BU message comprises a care-of address which is acquired with respect to the selected second interface.

14. The multi-mode terminal of claim 10, wherein the controller sets the selected second interface to a wake-up mode, and performs communication by using the selected second interface.

15. The multi-mode terminal of claim 14, wherein the controller sets the selected second interface to the wake-up mode and performs the communication by using the selected second interface if a success binding acknowledgement (Back) message is received from the home agent.

16. The multi-mode terminal of claim 10, wherein the controller transmits a plurality of binding update messages to a home agent via the plurality of interfaces if the second interface is unselected based on the first information.

17. The multi-mode terminal of claim 10, wherein the controller transmits a binding update (BU) message to the home agent and the BU message comprises at least one of 1) a length of a subnet prefix of a CoA wherein the CoA is acquired for an interface to transmit the BU message, 2) a number of BU messages which are transmitted to the home agent via the plurality of interfaces, and 3) information about a direction to be considered in a selection of binding.

18. A multi-mode terminal comprising:
   a plurality of interfaces which provide access capability to a plurality of heterogeneous networks, wherein remaining interfaces, excluding a selected first interface among the plurality of interfaces, are set to a sleep mode; and
   a controller which periodically requests, via the selected first interface, an information server for first information about each of the plurality of heterogeneous networks to which the plurality of interfaces provide the access capability,
   wherein the first information comprises information of a path from a source subnet of each of the plurality of interfaces of the multi-mode terminal to a destination subnet of a home agent with respect to a corresponding network of the plurality of heterogeneous networks.

19. The multi-mode terminal of claim 18, wherein, if a second interface with a better network performance than the selected first interface is detected, the controller sets the second interface to a wake-up mode, and performs communication by using the second interface based on the first information received from the information server.

20. The multi-mode terminal of claim 19, wherein, if the second interface with the better network performance than the selected first interface is detected, the controller sets the first interface into a sleep mode.

21. The multi-mode terminal of claim 19, wherein the first information comprises information regarding latency from the source subnet of the multi-mode terminal to the destination subnet, with respect to each of the plurality of heterogeneous networks to which the plurality of interfaces provide the access capability.

22. The multi-mode terminal of claim 19, wherein the first information comprises information regarding available bandwidth from the source subnet of the multi-mode terminal to the destination subnet, with respect to each of the plurality of heterogeneous networks to which the plurality of interfaces provide the access capability.

23. The multi-mode terminal of claim 19, wherein the controller generates a new care-of-address (nCoA) with respect to the second interface by using a subnet prefix that is stored in the information server.

24. The multi-mode terminal of claim 23, wherein the controller transmits a binding update message to the home agent, and the BU message comprises the nCoA.

* * * * *